US006237705B1

(12) United States Patent
Nakatani et al.

(10) Patent No.: US 6,237,705 B1
(45) Date of Patent: May 29, 2001

(54) SELF-PROPELLED STAIRS MOVING UNIT

(75) Inventors: Masato Nakatani; Shinichi Mita; Toshihide Araya; Yoshihiro Kitamura, all of Ishikawa-ken; Kiyotaka Deguchi, Saitama-ken; Toshiyuki Takai, Tokyo; Tadashi Takabatake, Tokyo; Hitomi Hibino, Tokyo, all of (JP)

(73) Assignee: Daido-Kogyo Kabushiki Kaisha, Kaga (JP)

( * ) Notice: Subject to any disclaimer, the term of this patent is extended or adjusted under 35 U.S.C. 154(b) by 0 days.

(21) Appl. No.: 09/382,301

(22) Filed: Aug. 24, 1999

(30) Foreign Application Priority Data

Aug. 24, 1998 (JP) ........................................ 10-237845
Aug. 24, 1998 (JP) ........................................ 10-237853

(51) Int. Cl.$^{7}$ .................................... B62D 55/065
(52) U.S. Cl. .................................... 180/8.2; 180/9.28
(58) Field of Search .................................... 180/8.2, 9.23, 180/9.28, 9.3, 9.32; 187/201, 270; 104/129

(56) References Cited

U.S. PATENT DOCUMENTS

| | | | | |
|---|---|---|---|---|
| 2,507,887 | * | 5/1950 | Cheney | 187/270 |
| 4,050,546 | * | 9/1977 | Wilson, Jr. | 187/12 |
| 4,269,285 | * | 5/1981 | Ohkoshi et al. | 187/9 R |
| 4,411,330 | * | 10/1983 | Blokland | 180/8 A |
| 4,627,508 | * | 12/1986 | Auer | 180/9.22 |
| 4,898,256 | * | 2/1990 | Lehner | 180/8.2 |
| 5,052,521 | * | 10/1991 | Wendt et al. | 187/12 |
| 5,158,309 | * | 10/1992 | Quigg | 280/5.22 |
| 5,197,558 | * | 3/1993 | Misawa | 180/8.2 |
| 5,533,594 | * | 7/1996 | Tremblay et al. | 187/201 |
| 5,577,567 | * | 11/1996 | Johnson et al. | 180/9.23 |

FOREIGN PATENT DOCUMENTS

| | | | | |
|---|---|---|---|---|
| 3316014 | * | 8/1988 | (DE) | 180/8.2 |
| 63-203483 | * | 8/1988 | (JP) | 180/7.1 |
| 1-145282 | * | 6/1989 | (JP) | 180/8.2 |
| 6-191412 | * | 7/1994 | (JP) | 180/6.7 |

OTHER PUBLICATIONS

Patent Abstracts of Japan, Publ. No. 06278665, "Guide Device for Stairway Lift", Publ. Oct. 4, 1994.

Patent Abstracts of Japan, Publ. No. 080080879 "Vehicle for Traveling on Sharply Inclined Group", Publ. Mar. 26, 1996.

* cited by examiner

*Primary Examiner*—Robert P. Olszewski
*Assistant Examiner*—Michael Cuff
(74) *Attorney, Agent, or Firm*—Duane Morris & Heckscher LLP

(57) ABSTRACT

The self-propelled stairs moving unit $A_1$ moves on stairs, putting a manual wheelchair K on the pallet 7, by driving the front crawler traveling units 1*a*, 1*b* and the rear crawler traveling units 2*a*, 2*b* wherein right and left are unitedly connected with each other. When the stairs moving unit $A_1$ is started to go up to the stairs from the flat face of lower hand, the front crawler traveling unit 1*a* relatively gently goes up. Then, the angle between the pallet 7 to be held to be level with the connecting shaft 6 which is rotation center of the traveling unit 1*a* as its center of oscillation and the line connecting both connecting portions of the support frames 5*a* connecting the front and rear crawler traveling units 1*a*, 2*a* (that is, the self-propelled portion) is slowly changed. When the stairs moving unit $A_1$ is transferred from the upper end of the stairs to the flat face, the front crawler traveling unit 1*a* goes over the connecting point 6 of the support frame 5*a* which is the load center, it is rotated to move in a moment with the connecting shaft 6 as its center from the full line position along the inclined face of the stairs to the chain line position along the flat face, but the pallet 7 is still held to be level with the connecting shaft 6 as its oscillation center. Then, the pallet can be held to be level on the transfer part between the flat face and the stairs as well as on the flat face and the inclined face of the stairs, thereby no fear is given to the person on a wheelchair on the pallet.

14 Claims, 18 Drawing Sheets

SELF-PROPELLED STAIRS MOVING UNIT

BACKGROUND OF THE INVENTION

The present invention relates to a self-propelled stairs moving unit going up and down the stairs of a station, public facilities or the like, traveling by the power of a driving source, putting a wheelchair or a baggage thereon. Especially, the present invention relates to the self-propelled stairs moving unit having crawler traveling units wherein a pallet can be held to be level, especially the pallet can be held to be level when the angle of the crawler traveling portion is rapidly changed at the upper end or the lower end of the stairs, and stable travel with small type is possible.

As a stairs moving unit for going the stairs up and down, putting a wheelchair on which a person rides is disclosed in the gazette of the Japanese patent application (First publication Number: Tokukaihei 6-278665). The stairs moving unit has a self-propelled body having crawler traveling units driven by a driving motor, and a pallet rotatably supported by the rear end portion of the self-propelled body with an axis in its front and rear portions. Besides, a holding handle is provided with the pallet, and a motor cylinder is provided between the pallet and the self-propelled body. When the stairs moving unit is moved on a flat face, the motor cylinder is set at a shrinkage position so as to hold the self-propelled body and the pallet in parallel, and the casters and the wheels provided with the pallet are contacted with the ground so as to travel the stairs moving unit. When the stairs moving unit is moved up and down the stairs, it travels with the driving motor in the state that the motor cylinder is extended and the face contacting ground of the cralwer is contacted with the ground more than two steps of the stairs and the self-propelled body is inclined along the inclination of the stairs, and then the pallet is held to be almost level.

Furthermore, the stairs moving unit has guide wheels projecting from the self-propelled body to the side. Then, the self-propelled body is stably traveled in such a manner that the guide wheel is inserted into the guide rail provided with the side portion of the stairs at the time of traveling the stairs moving unit up and down.

On the other hand, as shown in the gazette of the Japanese patent application (First publication number: Tokukaihei8-80879), a traveling unit for traveling on a rapid inclined place, having a pair of crawler traveling units on the right and left sides of the unit respectively is proposed. This type of unit has an upper rotating body which a work machine, such as a hydraulic shovel, is built in, support frame rotatably supporting the rotating body, and four crawler traveling units on the right and left, in which the front and rear units are a pair. The front crawler traveling units are connected with the front portion of the support frame, free to oscillate, and the support frame and the rear crawler traveling unit are connected with the connection pin provided with both end portions of the connection link, free to oscillate, and an oscillating jack is provided between the connection link and the rear end portion of the support frame.

The traveling unit for traveling on a rapid inclined place travels on a rapid inclined place in such a manner that the power from the engine provided with the work machine is transferred to the four crawler traveling units. Besides, the support frame, which front portion is supported by the front crawler traveling unit free to oscillate, is held to be almost level by the oscillating jack to be shrunk and extended on the basis of the signal from a level sensor.

Although the pallet putting a wheelchair or the like on can be held to be almost level when the above-mentioned stairs moving unit is traveled on a flat place or on the stairs having a predetermined inclined angle, the motor cylinder does not follow the rapid angular change of the self-propelled body when the stairs moving unit is traveled from a flat face to the stairs or from the stairs to a flat face. Then, the person on the wheelchair feels some misgivings by rapidly facing downward or upward.

Especially, when the stairs moving unit is traveled down the stairs from a flat face on the upper most step of the stairs, the crawler traveling unit is changed in its angle from the level state to the inclination of the stairs in a moment after its load center goes over the corner portion of the uppermost step. On this occasion, the person on the wheelchair is turned, facing downward in a moment by also facing the wheelchair to the forward, and the person strongly feels mental fears. Even if the guide wheel is inserted into the guide rail, the above-mentioned rapid angular change of the pallet can not be saved although an operator can stably operate, preventing the self-propelled body from slipping in lateral direction as long as the guide wheels are located on only one side so as not to support the load.

Besides, it is necessary to always position the holding handle which an operator hands on the upper side of the stairs in the stairs moving unit. For this reason, the person on the wheelchair feels that he may be turned so as to drop from the wheelchair when the unit goes down. Besides, when the unit goes up the stairs, the person on the wheelchair faces the backward and feels that he is turned in the upper direction at the upper end of the stairs, and feels physical disorder since he faces ordinary people going up the stairs.

On the other hand, the angular change of the support body of the rapid inclined place traveling unit having four crawler traveling units is smaller than one having each one crawler unit in right and left when the inclined angle is changed. Since the support frame is supported by the connection pins (the third oscillating connection portion) provided with the position projecting to the side hand and the upper hand from the truck frame of the front crawler traveling unit through brackets, when the front crawler traveling unit goes over the uppermost portion of the inclination (for instance, the corner portion of the uppermost portion of the stairs) and its angle is widely changed, the connection pins are moved, the support frames are moved forward and backward, and upward and downward. Then, it is difficult to maintain the work machine to be level so as to stably travel.

The above-mentioned stairs moving unit goes up and down, hooking the lug of rubber crawler on the corner portion of each step along the inclination of the stairs. But, the lug of the crawler is not hooked on the corner portion of the stairs when the stairs is wet or the travel direction of the crawler traveling unit and the stairs are not crossed at a right angle, then the crawler traveling unit is slipped and traveled obliquely, or the moving unit may face laterally. Although the moving unit can be prevented from facing laterally by inserting the guide wheel into the guide rail, the slip of the crawler traveling unit can not be saved, then it is not sufficient concerning the stable travel of the moving unit.

Besides, it is necessary that a longer rubber crawler traveling unit, which ground contacting face bridges at least two steps of the stairs, is provided and a inclined travel face having the height of one step or more of the stairs is provided. Then, the crawler traveling unit is made big.

Furthermore, since the relatively long crawler traveling unit is necessary, when the crawler traveling unit is transferred from a flat face to the stairs or from the stairs to a flat face, the angle of the crawler traveling unit is rapidly changed similar to the above-mentioned after the center of gravity of its load goes over the above-mentioned transfer point. Then, the motor cylinder can not follow the rapid angular change of the self-propelled body. The person on the wheelchair feels fears by rapidly facing downward or upward.

On the other hand, when the rapid inclined place traveling unit having four crawler traveling units is used for going the stairs up and down, the lug of the crawler is not hooked on the stairs and the crawler traveling unit may slip, in a similar way to the above-mentioned stairs moving unit. Taking such a state into consideration that concerning the four crawler traveling units, one of the front or the rear crawler traveling units is on the stairs and the other is on a flat face, two steps or more length of crawler ground contacting face is necessary in order to stably travel each crawler traveling unit, and furthermore, the inclined travel face of one step or more height of the stairs is necessary on the front hand of each crawler traveling unit. Then, it is not avoidable to make the unit large-sized.

OBJECT OF THE INVENTION

The first object of the present invention is to hold the pallet to be level even at the transfer portion between a flat face and stairs, as well as on a flat face and the inclined face of the stairs, in result, to provide the self-propelled stairs moving unit solving the above-mentioned problems.

The second object of the present invention is to use a compact crawler traveling unit and to prevent slip and oblique travel of the crawler traveling unit on the stairs, in result, to provide the self-propelled stairs moving unit solving the above-mentioned problems.

SUMMARY OF THE INVENTION

The self-propelled stairs moving unit (A) moves on the stairs in such a manner that an electric or a manual wheelchair (K) on which a person, for instance, rides is put on the pallet (7), in this state, the driving source (10, 13), such as an electric motor, is driven so as to rotate the front crawler units (1*a*, 1*b*) of right and left and the rear crawler units (2*a*, 2*b*) of right and left, then the self-propelled portion (3) is traveled. On this occasion, for instance, as shown in the lower portion of FIG. 1 and FIG. 13, when the self-propelled stairs moving unit (A) starts to go up from the flat face of the lower hand to the stairs, the front crawler traveling units (1*a*, 1*b*) relatively slowly go up such that its front and rear traveling faces bridge the height of one step of the stairs. Then, the angle between the pallet (7) held to be level with the connecting shaft (6) which is the center of the rotation of the front crawler traveling units (1*a*, 1*b*) as its oscillating center and the line (that is, the self-propelled portion) connecting both connecting portions of the support frames (5*a*, 5*b*) connecting the front and rear crawler traveling units (1*a*, 1*b*), (2*a*, 2*b*) is also slowly changed.

Furthermore, as the rear crawler traveling units (2*a*, 2*b*) are on the flat face and the front crawler traveling units (1*a*, 1*b*) go up on the stairs, the angle between the pallet (7) being in a level state by the horizontally holding means ($H_1$, $H_2$, $H_3$) and the self-propelled portion (3) becomes to be big, but its change rate (angular velocity) is made smaller. And, when the rear crawler traveling units (2*a*, 2*b*) are also positioned on the stairs, the angle of the traveling portion (3) becomes to be constant angle along the inclination of the stairs, and the angular change to the pallet (7) in a level state becomes to be O.

For instance, as shown in the upper portion of FIG. 1 and FIG. 13, when the self-propelled stairs moving unit (A) is transferred from the upper end of the stairs to the flat face, after the front crawler traveling units (1*a*, 1*b*) go over the connecting point (6) of the support frames (5*a*, 5*b*) which is the center of the load, it is rotated to move from the full line position along the inclination of the stairs to the chain line position along the flat face with the connecting shaft (6) as its center, in a moment. But, the pallet (7) is still maintained to be level with the connecting shaft (6) as its oscillating center since the connecting shaft (6) is not moved. Furthermore, when the self-propelled portion (3) advances, the front crawler traveling units (1*a*, 1*b*) are moved on the flat face and the rear crawler traveling units (2*a*, 2*b*) are moved along the inclination of the stairs. For this reason, the angle of the self-propelled portion (3) (the line connecting both connecting points of the support frames) is gradually made smaller (close to be level). And, the angle between the pallet (7) in a level state and the self-propelled portion (3) is changed, but its change rate (angular velocity) is small.

As mentioned before, since the change of the angle between the self-propelled portion (3) and the pallet (7) is small, the pallet (7) can be held to be level by the horizontally holding means ($H_1$, $H_2$, $H_3$), relatively easily and certainly. For instance, as shown in FIGS. 1, 4, 12, the self-propelled portion (3) is traveled such that the rotating rollers (22) provided with the pallet (7) are moved to rotate on and guided by the guide rail (21) so as to hold the pallet (7) to be level. On this occasion, the moment load acting on the pallet (7) is received by the spring (23), such as a gas spring, and the load of the pallet (7) directly acts on the front crawler traveling units (1*a*, 1*b*) by the connecting shaft (6), and acts on the guide rail (21) from the rotating rollers (22), furthermore, acts on the rear crawler traveling units (2*a*, 2*b*) through the spring (23) and the support frames (5*a*, 5*b*). That is, this load is dispersed to support.

Besides, for instance, as shown in FIG. 13 through FIG. 16, the cylinder unit (26), such as a motor cylinder, is shrunk, corresponding to the angular change between the self-propelled portion (3) and the pallet (7), which change rate is small, on the basis of the signal from the horizontal detecting means (25), such as a gyro (gas rate) provided with the pallet (7) so as to hold the pallet (7) to be almost level.

Furthermore, for instance, as shown in FIGS. 17 through 19, the relation of the self-propelled portion (3) with respect to the stairs when the self-propelled portion (3) travels on the stairs (including the front and rear flat face) is detected by the detecting means (45, 46, 47), and the cylinder unit (26) is shrunk and extended in accordance with the program set in advance with the inclination of the stairs so as to hold the pallet (7) to be almost level. As an instance, when the front crawler traveling units (1*a*, 1*b*) are on the starting point of the stairs and are inclined from the level state, the front angle detecting means (46) detects the relative angular change with the support frame (5*a*), thereby the cylinder unit (26) is driven in a direction so as to hold the pallet (7) to be almost level in spite of the angular change of the support frame (the self-propelled portion). When the rear crawler traveling units (2*a*, 2*b*) also travel to the starting point of the stairs and the supporting frame (5*a*) (the self-propelled portion) is along the inclination of the stairs, the driving of the cylinder unit is stopped so as to maintain the pallet (7) to be level, corresponding to the inclination of the stairs. When it further advances and the front crawler traveling units (1*a*, 1*b*) reach the uppermost end of the stairs, the crawler traveling unit is rotated to move and the front angle detecting means (46) detects the angular change with respect to the support frame. Then, the cylinder unit (26) is driven in the other direction so as to hold the pallet (7) to be level in spite of the angular change of the support frame. And, in order to move the present stairs moving unit in the going down direction of the stairs, the driving of the cylinder unit (26) is started by the rear angle detecting means (47) on the front side with respect to the advance direction.

In the self-propelled stairs moving unit (A), the electric or manual wheelchair (K) is put on the pallet (7) on which a person, for instance, rides, the driving source, such as a electric motor, is driven, and the driving force is transferred to the right and left crawler traveling units (R, L) of the self-propelled portion (3). One of the right and left crawler traveling units (L, 1*b*, 2*b*) is prevented from slipping and guided by the rail means (31) having irregular portion, and travels along the inclination of the rail means. And, the other crawler traveling means (R, 1*a*, 2*a*), which are rotatably supported by the support frames (5*a*, 5*b*) and oscillate together with one crawler traveling unit travels on the stairs in such a state that it is inclined along the inclination of the rail means (31) provided along the inclination of the stairs.

On this occasion, one of the crawler traveling unit travels without slip, engaging the tooth (32*a*) of the crawler (32) with the tooth (33*a*) of the longer member (33) of the rail means (31), and travels along the inclination of the stairs, without oblique travel, by guiding its both sides with the snaking prevention guide (35). Furthermore, for instance, the crawler traveling unit travels, preventing from coming up from the rail means (31) by contacting the idler roller (36) with the guide rail (37) so as to rotate.

The present invention of claim 1 is a self-propelled stairs moving unit, comprising:

- a front crawler traveling unit (1*a*, 1*b*) and a rear crawler traveling unit (2*a*, 2*b*) respectively provided with right and left, and a self-propelled portion (3) having a driving source (13, 20) for driving said these crawler traveling units,
- a right and a left support frame (5*a*, 5*b*), each for rotatably connecting said front crawler unit and said rear crawler unit of right and left respectively;
- a pallet (7) supported by rotatable connecting shaft (6) of said front crawler unit (1*a*, 1*b*) in said right and left support frames free to oscillate; and
- a horizontally holding means ($H_1$, $H_2$, $H_3$) for holding said pallet to be level in spite of inclination of said self-propelled portion.

According to the invention of claim 1, the front crawler traveling units of right and left and the rear crawler traveling units of right and left are provided, and the pallet is supported, free to oscillate, with the connecting shaft by which the front crawler traveling unit is supported with the support frame as its center. Then, when the self-propelled stairs moving unit travels between the flat face and the stairs, the angular change between the self-propelled portion and the pallet can be made gentle, and the pallet can be certainly and easily held to be level by the horizontally holding means. And, since the driving source is provided with the self-propelled portion, the self-propelled portion easily and certainly gets the power from the driving source so as to travel although there is the angular change between the self-propelled portion and the pallet.

The present invention of claim 2 is the self-propelled stairs moving unit wherein a rail means (31) having an irregular portion is provided with a side portion of stairs along the inclination of the stairs, and one side of said crawler traveling units (L) of right and left travel guided in the state that it is prevented from slipping by said rail means (31) and the other side of crawler traveling unit (R) travel on the stairs.

According to the present invention of claim 2, the crawler traveling units of one side travel guided in the state that it is prevented from slipping by the rail means having an irregular portion. Then, the crawler traveling unit is not slipped and is not obliquely traveled, and the self-propelled stairs moving unit can stably go up the stairs. Besides, since the right and left crawler traveling units are unitedly connected and are rotatably supported by the support frame, the other side of the crawler traveling unit also travels on the stairs, being inclined along the inclination of the rail means. Then, high inclined traveling face for crossing over the stairs is not provided with the front portion of the crawler traveling unit, and then, the self-propelled portion can be made compact. Furthermore, by providing the guide rail with the side of the stairs only, it is not necessary to provide the rail means with the stairs portion for the other side of the crawler traveling unit. Accordingly, convenience of the stairs in use is not damaged.

The present invention of claim 3 (see FIGS. 5, 7) is the self-propelled stairs moving unit as set forth in claim 1 wherein the self-propelled portion (3) has a front self-propelled portion (3F) and a rear self-propelled portion (3R),

- the front self-propelled portion is comprised in such a manner that the front crawler traveling units of right and left (1*a*, 1*b*) are unitedly connected with each other with a driving shaft (10) connecting right and left driving wheels (9*a*, 9*b*) and a connecting shaft (6) connecting the center portions of right and left truck frames (11*a*, 11*b*), and a front electric motor (13) is provided bridging between the driving shaft and the connecting shaft, and an output shaft of the electric motor is interlocked with the driving shaft (10),
- the rear self-propelled portion is comprised in such a manner that the rear crawler traveling units of right and left (2*a*, 2*b*) are unitedly connected with each other with a driving shaft (16) connecting right and left driving wheels (15*a*, 15*b*) and a connecting shaft (19) connecting the center portions of right and left truck frames (17*a*, 17*b*) and a rear electric motor (20) is provided bridging between the driving shaft and the connecting shaft, and an output shaft of the electric motor is interlocked with the driving shaft (16), and the support frames of right and left (5*a*, 5*b*) are rotatably supported by the connecting shaft (6) of the front self-propelled portion (3F) and the connecting shaft (19) of said rear self-propelled portion (3R).

According to the invention of claim 3, the front and rear crawler units of right and left are respectively connected with the connecting shaft and the driving shaft, and the front and rear electric motors are supported by these connecting shaft and the driving shaft. Then, the self-propelled portion is made simple structure, and the transmission can be also made simple and compact. Furthermore, by connecting the support frames with the front and rear connecting shaft, the front self-propelled portion and the rear self-propelled portion, each being united, can be connected by the support frame, then relatively light and highly credible self-propelled portion can be gotten.

The present invention of claim 4 (see FIGS. 1, 4, 12) is the self-propelled stairs moving unit as set forth in claim 1 wherein said horizontally holding means ($H_1$) has a guide rail (21) provided with a side portion of the stairs, rotating rollers (22) provided projecting for a side of said pallet, and springs (23) provided between said pallet (7) and the support frames (5*a*, 5*b*), whereby said pallet is held to be almost level in such a manner that the spring receives a moment load acting on the pallet (7) and said rotating roller (22) is contacted with said guide rail (21) so as to rotate and is guided by said guide rail.

According to the invention of claim 4, since the pallet is held to be almost level by the rotating rollers and the guide rail, the pallet is always, certainly and geometrically held to be level. Besides, the load acting on the pallet is dispersed and supported by the front crawler unit, the rear crawler unit and the rotating rollers by the spring. Then, the self-propelled stairs moving unit having high credibility and stability, which gives no fear to the person on the wheelchair can be gotten.

The present invention of claim 5 (see FIGS. 13, 14, 15, 16) is the self-propelled stairs moving unit wherein the horizontally holding means ($H_2$) has a level detecting means (25) for detecting an angle of the pallet (7) with respect to a level face, and a cylinder unit (26) provided between the pallet (7) and the support frame (5*a*, 5*b*), whereby the cylinder unit (26) is controlled to be shrunk and extended on the basis of a signal from the level detecting means (25) so as to hold the pallet (7) to be almost level.

According to the invention of claim 5, since the pallet is held to be almost level by the level detecting means and the cylinder unit, a guide rail for providing with the stairs is not necessary, and the setting of the self-propelled stairs moving unit can be made easy and the term of its construction work can be shortened. Besides, since the guide rail is provided so as not to project from the upper end or the lower end of the stairs, it is not hindrance for the person who goes the stairs up and down, and the convenience of the stairs in use is not damaged, and then the applying bound of the self-propelled stairs moving unit can be easily broadened.

The present invention of claim 6 (see FIGS. 17, 18, 19) is the self-propelled stairs moving unit wherein the horizontally holding means ($H_3$) has a detecting means (45, 46, 47) for detecting a relation of the self-propelled portion with respect to the stairs when the self-propelled portion (3) is traveled on the stairs, and a cylinder unit (26) provided between the pallet (7) and the support frame (5*a*, 5*b*), whereby the cylinder unit (26) is controlled to be shrunk and extended by a signal from the detecting means (45, 46, 47) on the basis of a program set in advance with an inclination of the stairs so as to hold the pallet (7) to be almost level.

According to the invention of claim 6, since the relation of the self-propelled portion with respect to the stairs when the self-propelled portion travels on the stairs is detected and the cylinder unit is controlled by the program set in advance, a hunting does not occur as feedback control. Besides, the pallet can be stably held to be level just like by the guidance with a guide rail although the convenience of the stairs in use is not damaged without using a guide rail. Then, the self-propelled stairs moving unit having high credibility and stability, improving its safety can be gotten.

The present invention of claim 7 (see FIGS. 3, 15) is the self-propelled stairs moving unit wherein a protection frame (29) is provided with sides of right and left and rear face of the pallet (7) and extension plates (30) rotatably supported by bottom face (28) of said pallet is provided with a front face of the pallet, and the extension plate is comprised of a folded structure.

According to the invention of claim 7, since the extension plate is provided with the front face of the pallet, a wheelchair or the like get on and off the pallet from the front portion on the upper end of the stairs. Then, there is no fear so as to fall down from the stairs by getting on and off from the stairs side, thereby credibility can be improved for the person who gets on a wheelchair or the like. Furthermore, since the extension plates are comprised of the folded structure, getting on and off of a wheelchair is easy. Besides, the pallet is held to be level, a wheelchair can get on, facing the front and the back, so it is possible to correspond the advance direction of the self-propelled moving unit with the facing of a wheelchair. Accordingly, giving the feeling of physical disorder to the person getting on a wheelchair can be prevented.

The present invention of claim 8 (see FIGS. 5, 6, 11, 12) is the self-propelled stairs moving unit as set forth in claim 2 wherein the crawler traveling unit (R, L, 1*a*, 1*b*, 2*a*, 2*b*) has a rubber crawler (32) having teeth (32*a*) formed at a predetermined pitch over its whole outer peripheral face, and the rail means (31) has a longer member (33) having teeth (33*a*) formed at the same pitch as one of the rubber crawler and a snaking prevention guide (35) for guiding the sides of said crawler, located along right and left of the longer member.

According to the present invention of claim 8, since one side of the crawler traveling unit travels in such a manner that the tooth of the rubber crawler and the tooth of the longer member are engaged with each other, and the side thereof is guided by the snaking prevention guide, the self-propelled stairs moving unit can be traveled without slip and oblique travel, with high safety and credibility.

The present invention of claim 9 (see FIG. 11) is the self-propelled stairs moving unit wherein said longer member is comprised of a rubber toothed open belt (33).

According to the present invention of claim 9, since the self-propelled stairs moving unit travels by the engagement of the rubber crawler and the toothed open belt, it is very quiet. Besides, by fixing the open belt by the bottom face of the rail means with adhesion, the construction of the rail means can be made easy and can be completed in a shorter time.

The present invention of claim 10 (see FIGS. 1 through 4) is the self-propelled stairs moving unit wherein an idler roller (36) is provided coaxially with a connecting portion (6) of the crawler traveling unit for the support frame (5*a*, 5*b*), and a coming up prevention guide rail (37) for preventing from coming up from the rail means of one side of the crawler traveling units (L, 1*b*,2*b*) by contacting said idler roller so as to rotate is provided with an upper hand of the rail means (31).

According to the present invention of claim 10, coming up of the crawler traveling unit from the rail means is prevented by the coming up prevention guide rail. Even if a moment acts on the pallet or coming up force acts on the crawler traveling unit at the transfer portion between the stairs and the flat face, the crawler certainly contacts with the rail means, and stable traveling can be secured, preventing slip and oblique traveling.

The invention of claim 11 (see FIGS. 1, 5, 13, 17 through 19) is the self-propelled stairs moving unit wherein the self-propelled portion has a front self-propelled portion (3F) and a rear self-propelled portion (3R), the front self-propelled portion is comprised in such a manner that the front crawler traveling units of right and left (1*a*, 1*b*) are unitedly connected with each other with a driving shaft (10) connecting right and left driving wheels (9*a*, 9*b*) and a connecting shaft (6) connecting the center portions of right and left truck frames (11*a*, 11*b*) and a front electric motor (13) is provided bridging between the driving shaft and the connecting shaft, and an output shaft of the electric motor is interlocked with the driving shaft (10), the rear self-propelled portion is comprised in such a manner that the rear crawler traveling units of right and left (2*a*, 2*b*) are unitedly connected with each other with a driving shaft (16) connecting right and left driving wheels (15*a*, 15*b*) and a connecting shaft (19) connecting the center portions of right and left truck frames (17*a*, 17*b*), and a rear electric motor (20) is provided bridging between the driving shaft and the connecting shaft, and an output shaft of the electric motor is interlocked with the driving shaft (16), and the support frames (5*a*, 5*b*) are rotatably supported by the connecting shaft (6) of the front self-propelled portion (3F) and the connecting shaft (19) of the rear self-propelled portion (3R) in right and left of the pallet (7).

According to the invention of claim 11, since the pallet is supported, being free to oscillate, with the connecting shaft with which the front crawler traveling unit is supported by the support frames, as its center, the angular change between the self-propelled portion and the pallet can be made small even if the self-propelled stairs moving unit is transferred between the flat face and the stairs, and the pallet can be certainly and easily held to be level by the horizontally holding means. And, since the front and rear crawler units of right and left are respectively connected with each other with the connecting shaft and the driving shaft and the front and rear electric motors are supported by these connecting shaft and the driving shaft, the self-propelled portion is made simple structure and the transmission can be made easy and compact. Furthermore, by connecting the front and rear connecting shafts with the support frame, the front self-propelled portion and the rear self-propelled portion, each being united, can be connected by the supporting frames. Then, relative light, highly credibile self-propelled portion can be gotten.

The present invention of claim 12 (see FIGS. 1, 5, 13) is the self-propelled stairs moving unit wherein the length of a crawler contacting ground face per one crawler traveling unit (1*a*, 1*b*, 2*a*, 2*b*) is less than the length of two steps of the stairs.

According to the invention of claim 12, the crawler traveling unit may have relatively short length, and the self-propelled portion can be made compact.

The present invention of claim 13 (see FIG. 8(*a*)) is the self-propelled stairs moving unit 1 wherein a plurality of supporting wheels (40) including casters (40*a*) is provided with lower hand of the pallet (7), and an operation means (41, 63*a*, 63*b*) for switching into the position projecting the crawler traveling unit (R, L, 1*a*, 1*b*, 2*a*, 2*b*) to lower hand and the position retreating to the upper portion with respect to these supporting wheels (40) is provided.

According to the present invention of claim 13, the self-propelled stairs moving unit travels with the wheels including the casters on the flat face and can be traveled to a desired position by easily changing direction. Besides, the wheels are retreated to the upper hand of the crawler traveling unit at the time of going the stairs up and down so as to certainly prevent hindrance of the travel of the crawler traveling unit by the interference between the wheels and the stairs.

The present invention of claim 14 (see FIG. 8(*b*) is the self-propelled stairs moving unit wherein a plurality of supporting wheels (40) including casters (40*a*) is provided with the lower hand of the pallet (7), and an operation means (41, 42, 63', 63*b*') for switching into the position projecting the front crawler traveling unit (1*a*, 1*b*) and the rear crawler traveling unit (2*a*, 2*b*) to lower hand and the position retreating to the upper portion with respect to these supporting wheels (40), and the position retreating one of the front and rear crawler traveling units (1*a*, 1*b*) to the upper portion with respect to said casters (40*a*) and projecting the other crawler traveling unit (2*a*, 2*b*) to lower hand with respect to said other supporting wheels (40) is provided.

According to the present invention of claim 14, when there is the irregular portion, such as a braille block even when moving on the flat face, the transfer with wheels may be considered to be heavy, but in such a case, one of the front and rear crawler traveling unit is contacted with the ground and the self-propelled stairs moving unit is traveled with one crawler traveling unit and the casters, then, can be operated in a desired direction, and so, is easily transferred on the flat face having the irregular portion by only one operator even in the state that an electric wheelchair is put on the pallet.

DESCRIPTION OF THE PREFERRED EMBODIMENT

Figure 3:
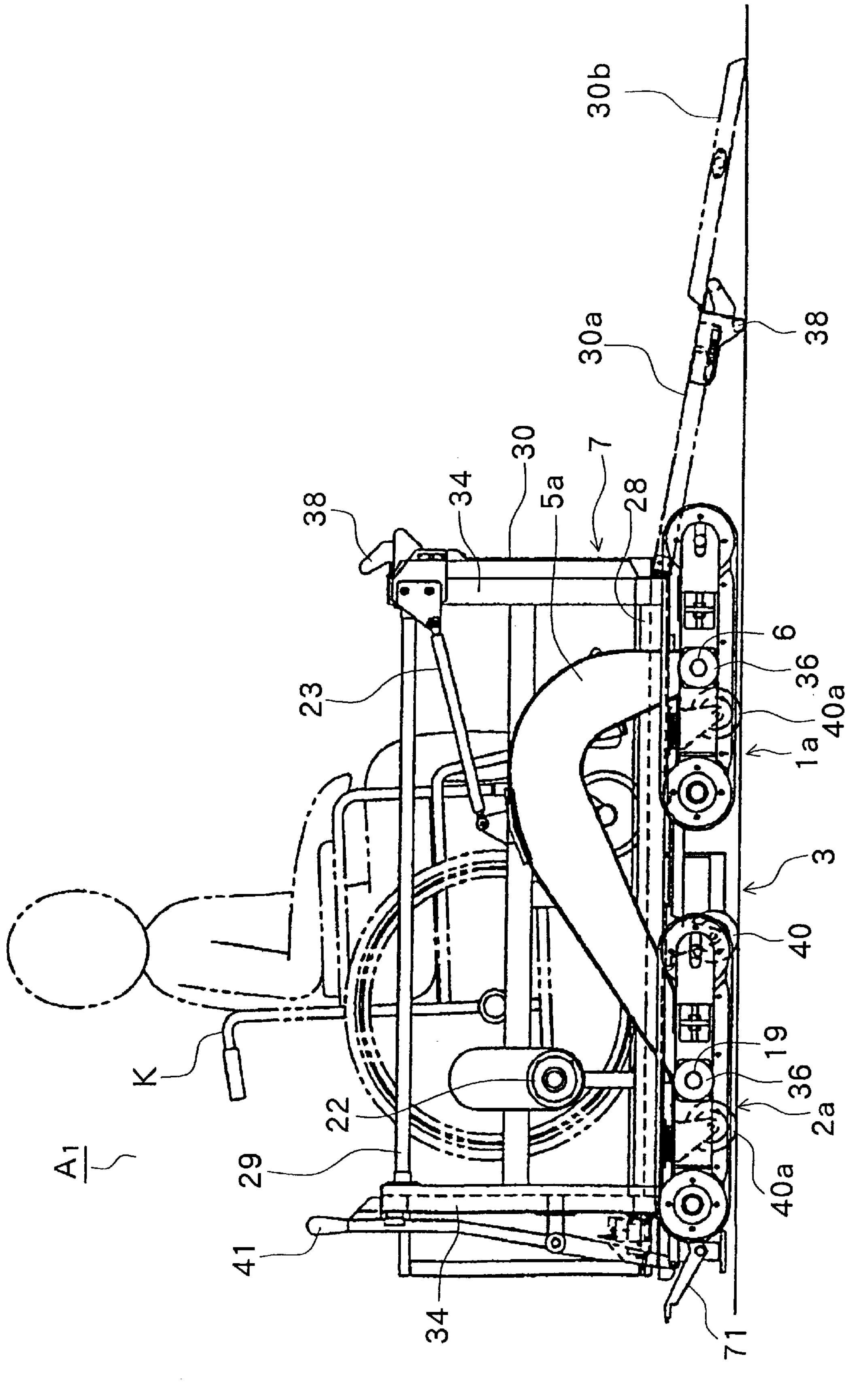
FIG. 3 is a side view of the self-propelled stairs moving unit of FIG. 1.
Figure 4:
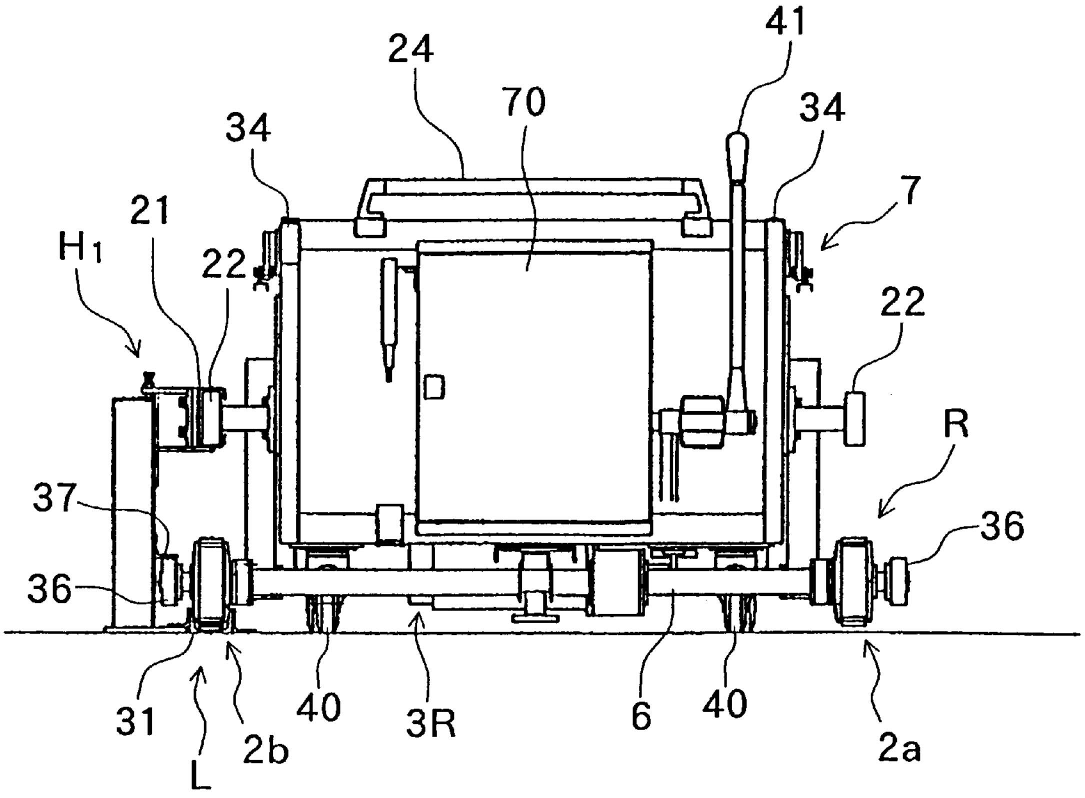
FIG. 4 is a back view of the self-propelled stairs moving unit of FIG. 1.
Figure 5:
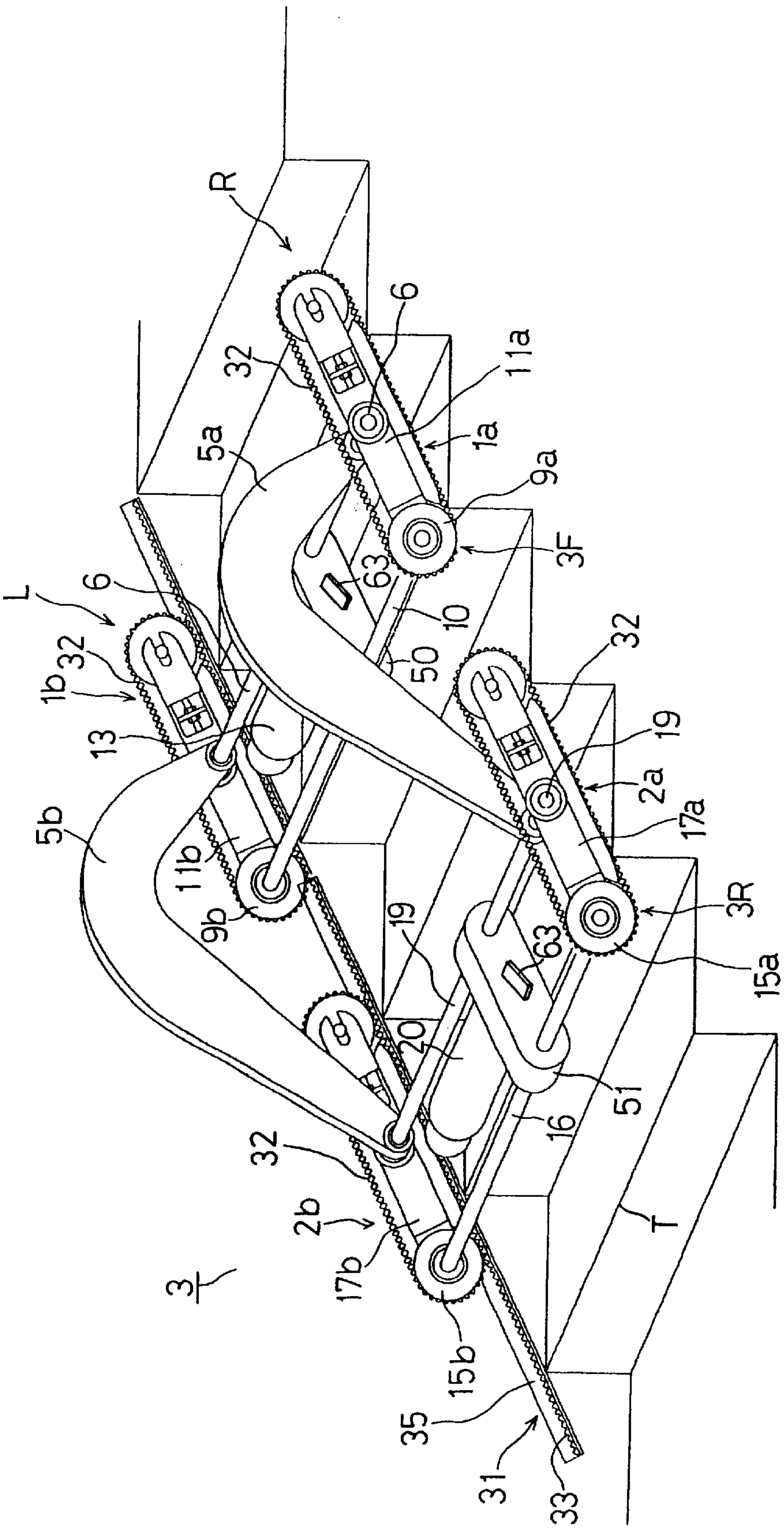
FIG. 5 is a view obliquely seen, showing a self-propelled portion.
Figure 7:
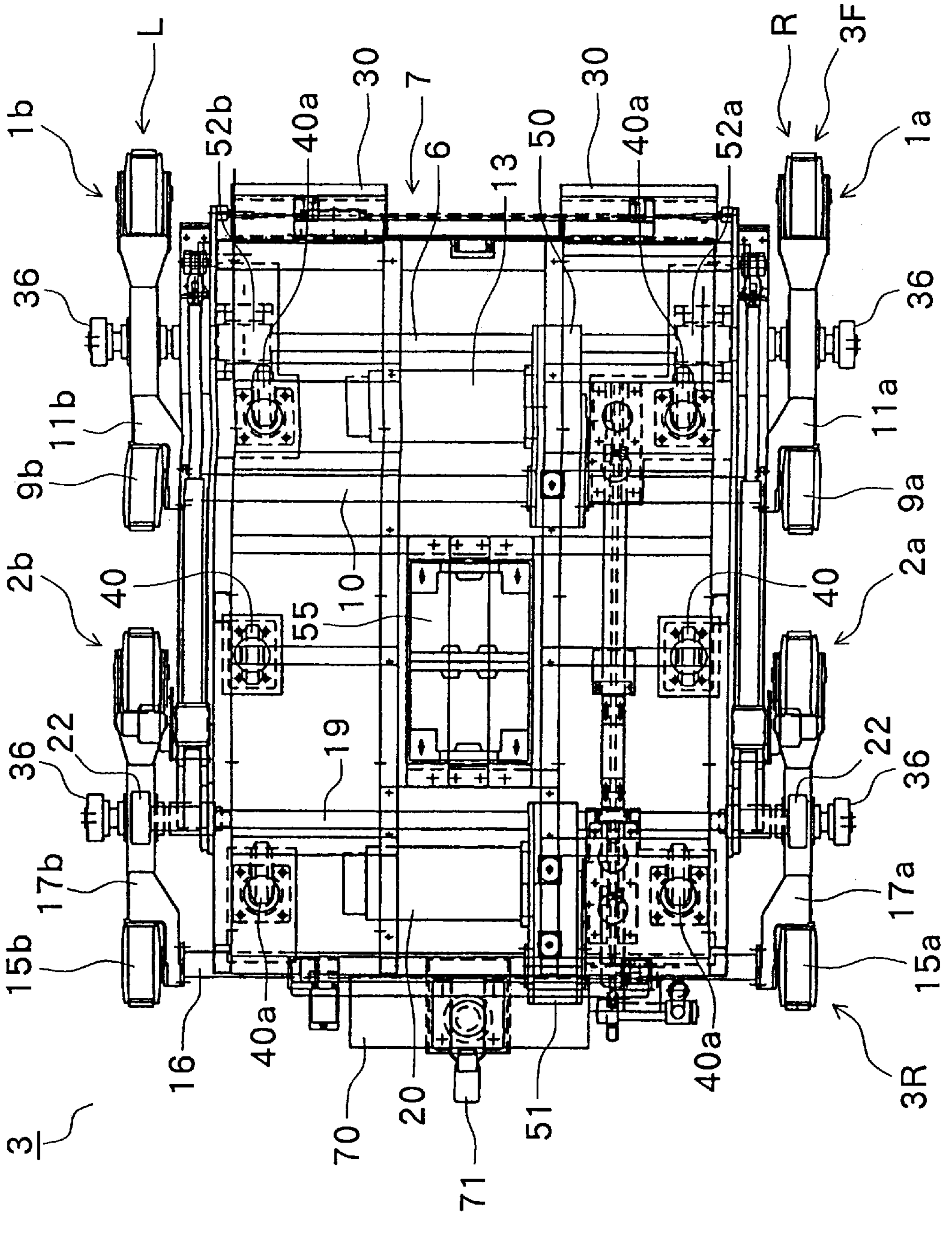
FIG. 7 is a plan view showing the self-propelled portion.

Embodiments of the present invention will now be described hereinafter with respect to the accompanying drawings. With a self-propelled stairs moving unit $A_1$ according to the form of the first embodiment, a self-propelled portion 3, a support frame 5(*a, b*), a pallet 7 capable of locating an electric or a manual wheelchair K or the like thereon and a horizontally holding means $H_1$ for holding the pallet 7 in a horizontal state are provided, as shown in FIGS. 1 through 4. The self-propelled portion 3 has front crawler traveling units 1*a*, 1*b* and rear crawler traveling units 2*a*, 2*b* on right and left, as shown in FIG. 5 and FIG. 7. A pair of the front and rear crawler traveling units comprises a crawler traveling unit R or L in right or left.

The front crawler traveling units 1*a* and 1*b* in right and left are unitedly connected with each other in such a manner that truck frames 11*a* and 11*b* in the center of each crawler traveling unit are connected by a connecting shaft 6 and driving wheels 9*a* and 9*b* are connected by a driving shaft 10. At the same time, the rear traveling units 2*a* and 2*b* in right and left are unitedly connected with each other in such a manner that truck frames 17*a* and 17*b* in the center of each crawler traveling unit are connected by a connecting shaft 19 and driving wheels 15*a* and 15*b* are connected by a driving shaft 16. Furthermore, the front and rear connecting shafts 6 and 19 are rotatably supported by the right and left support frames 5*a* and 5*b*. Then, the front and rear crawler traveling units 1*a* and 1*b*, 2*a* and 2*b* are respectively rotatably supported by the support frame 5*a* and 5*b* in their center portion.

A front electric motor 13 comprising a DC motor with electromagnetic brake is supported extending from the front connecting shaft 6 to the driving shaft 10, and an output shaft of the motor 13 is interlocked to the driving shaft 10 through a reduction gear stored in a case 50. The electric motor 13, the connecting shaft 6, the driving shaft 10 and the front crawler traveling units 1*a* and 1*b* in right and left unitedly provided comprises a front self-propelled portion 3F. Besides, a rear electric motor 20 comprising the same DC motor with electromagnetic brake is supported extending from the rear connecting shaft 19 to the driving shaft 16, and an output shaft of the motor 20 is interlocked to the driving shaft 16 through a reduction gear stored in a case 51. The electric motor 20, the connecting shaft 19, the driving shaft 16 and the rear crawler traveling units 2*a* and 2*b* in right and left unitedly provided comprises a rear self-propelled portion 3R.

Figure 2:
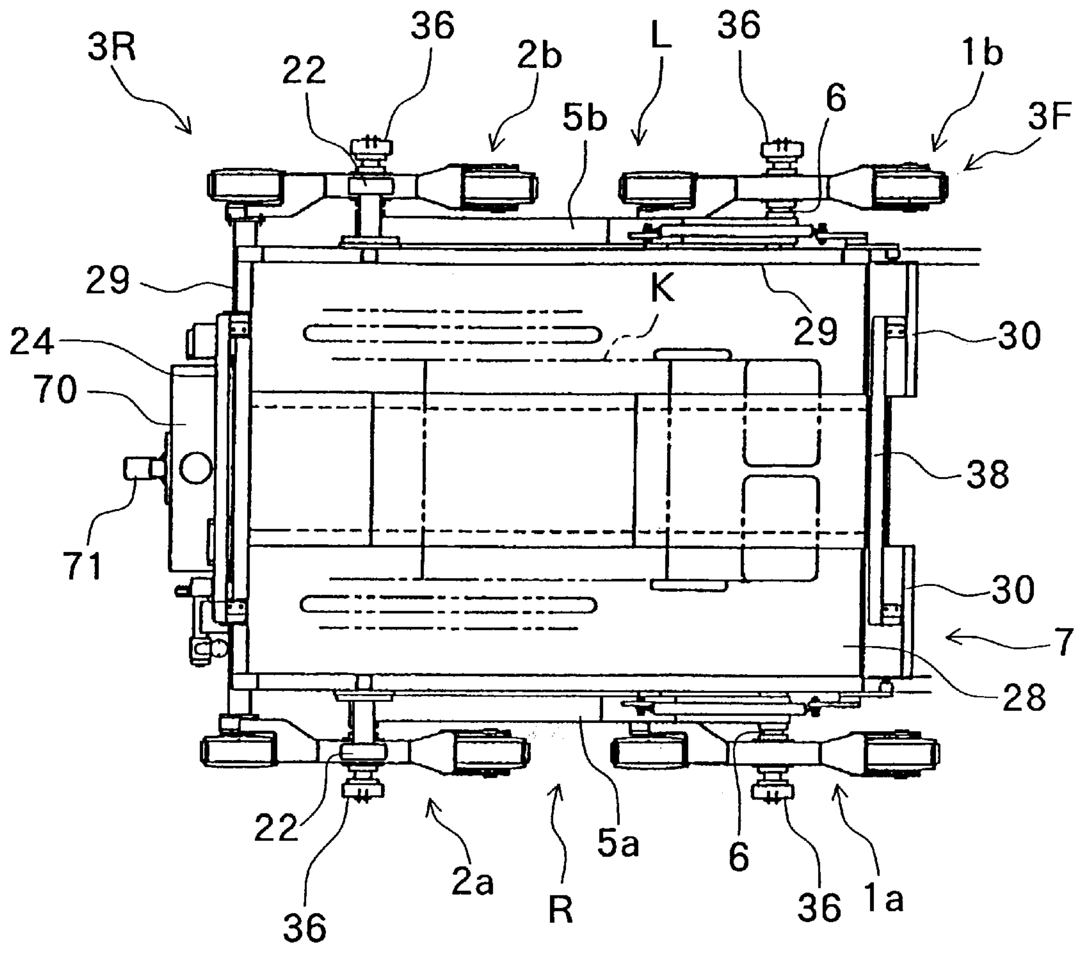
FIG. 2 is a plan view of the self-propelled stairs moving unit of FIG. 1.
Figure 9:
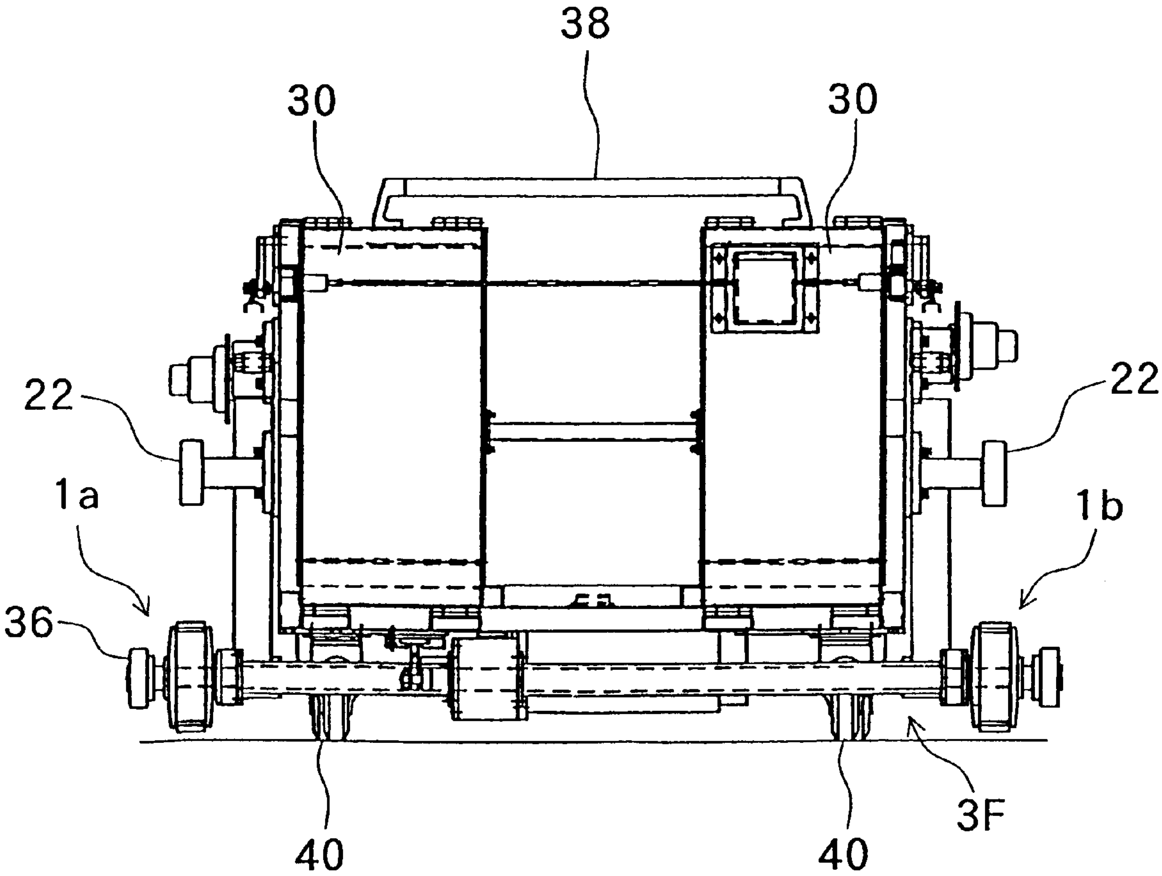
FIG. 9 is a front view of the self-propelled stairs moving unit.

Furthermore, the pallet 7 is supported by the front connecting shaft 6 through right and left bearings 52*a*, 52*b* so as to oscillate, as shown in FIG. 7. As shown in FIGS. 2, 3, 4, in the pallet 7, a column 34 is respectively provided on four corners of a bottom plate 28, and a protection frame 29 is provided on the right and left side faces and on the back face, extending from the column to the column. And, a handle is provided on the back portion. As shown in FIG. 3 or 9, right and left extending plates 30, 30 are provided with the front portion of the bottom plate of the pallet 7 so as to rotate. The extending plate has folding structure being comprised of two plates 30*a*, 30*b* connected so as to rotate, and the right and left extending plates are connected with each other with a lateral bar 38 or the like at a connecting portion. Furthermore, gas springs 23 are provided between the upper end of the right front column 34 and the right support frame 5*a* and between the upper end of the left front column 34 and the left support frame 5*b*, and the springs receive moment load acting on the pallet 7. With the bottom plate 28 of the pallet 7, a battery 55 is loaded, at the center portion of the lower face thereof, as shown in FIG. 7. Respective casters 40*a* and 40*a* are provided at the right and left, and front and rear portions of the pallet 7, and fixed wheels 40, 40 are provided on the center portion.

Figure 6:
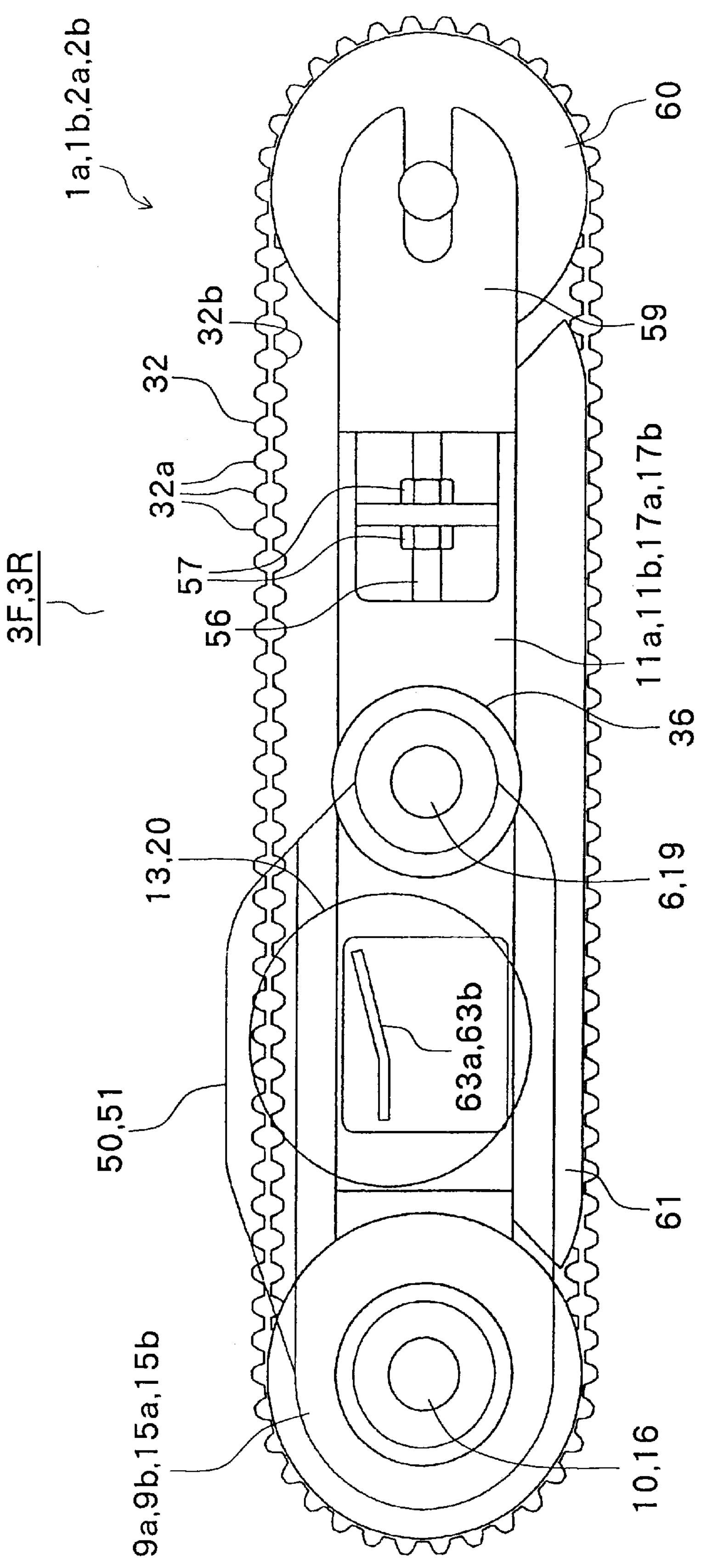
FIG. 6 is a side view showing a crawler traveling unit (front and rear self-propelled portions)

Each crawler traveling unit 1*a*, 1*b*, 2*a*, 2*b* of the right and left, and front and rear has the truck frame 11*a*, 11*b*, 17*a*, 17*b*, which center portion is rotatably supported by the connecting shaft 6, 19, as shown in FIG. 6. The driving wheel 9*a*, 9*b*, 15*a*, 15*b* is rotatably supported on one end portion of the truck frame. A slide frame 59 is supported on the other end portion side of the truck frame, free to adjust in longitudinal direction with a bolt 56 and a nut 57, and an idler wheel 60 is supported by the frame 59. Besides, a guide rail 61 is fixed on the lower side of the truck frame. A rubber crawler 32 is wound round each of the driving wheels 9*a*, 9*b*, 15*a*, 15*b* and the idler wheel 60. That is, each crawler traveling unit 1*a*, 1*b*, 2*a*, 2*b* is rotatably supported by the connecting shaft 6 or 19 in the almost center in its length (front and rear) direction and in width (up and down) direction.

Besides, teeth 32*a*, 32*b* which are formed at the same pitch, are formed around the outer and inner circumference faces of the crawler 32, and these teeth extend over all of width of the crawler so as to cross at a right angle to the longitudinal direction. A tooth, such as a timing pulley, is formed on the driving wheel 9*a*, 9*b*, 15*a*, 15*b*, and a flange is formed on the driving wheel so as to project in the outer diameter direction of both sides. Besides, the idler wheel 60 is in the shape of a cylinder and flanges are provided with both sides thereof. Accordingly, the crawler 32 travels connecting with the ground in such a manner that its inner tooth 32*b* engages with the tooth of the driving wheel so as to rotate between the idler wheel 60 and the driving wheel, and the lower face is supported by the guide rail 61. Then, numerals 63*a*, 63*b* in FIG. 6 means inclined cam pieces for connecting the crawler traveling unit with the ground and releasing this connection, and are provided so as to project on the side face of the transmission cases 50, 51 (see FIG. 5, explained hereinafter in FIG. 8).

Figure 11:
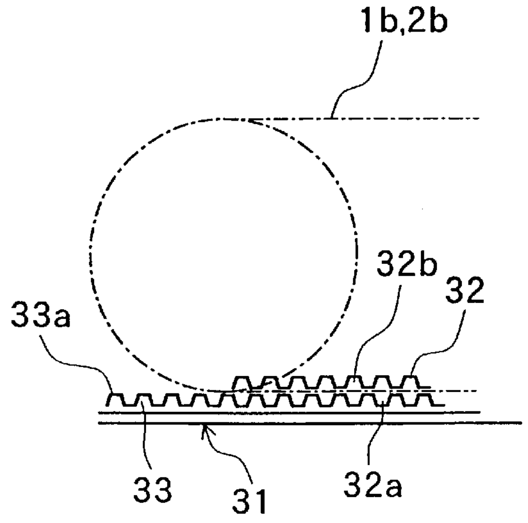
FIG. 11 is a view showing the engagement of the crawler traveling unit and rail means.
Figure 12:
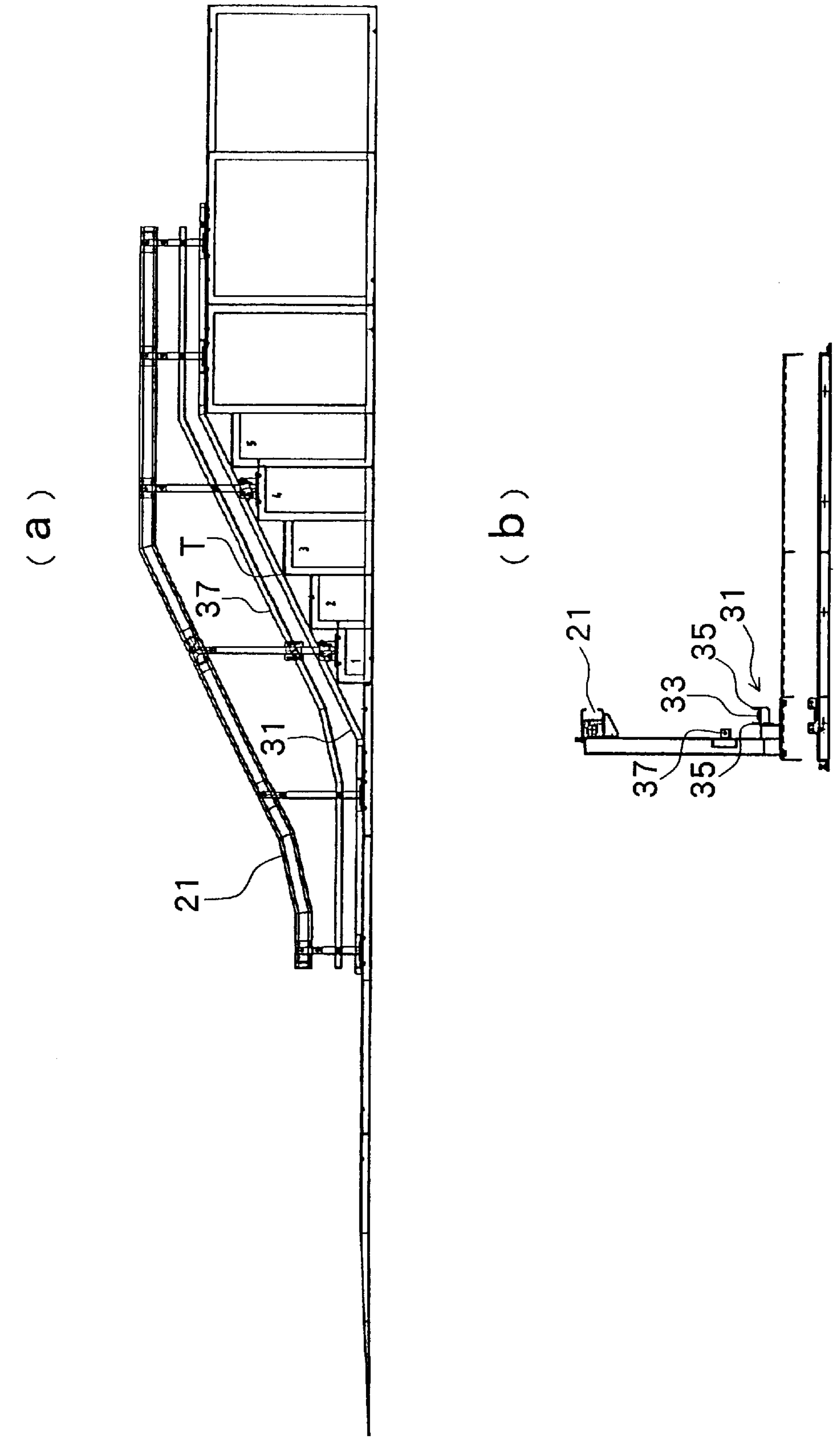
FIG. 12 is a view showing stairs model applied to the form of the first embodiment, (a) is a side view and (b) is a front view.

As shown in FIGS. 1, 4, 5 and 12, a rail means 31, a coming up prevention guide rail 37 and a horizontally holding guide rail 21 are provided with one side portion of stairs, in order from the lower portion. The rail means is provided along the inclination of the stairs, that is, so as to connect corner portions T of the stairs with each other, and the rail means is provided extending a predetermined length from the stairs on the upper and lower flat faces of the stairs. The rail means has an irregular portion for non-slip on its bottom face, as shown in FIG. 11 and FIG. 12(*b*) in detail. In the concrete, a longer member 33 having a tooth 33*a* of the same pitch as the tooth 32*a* of the outer peripheral face of the crawler 32 is fixed. Preferably, the longer member is a rubber toothed open belt 33, and the longer toothed belt is fixed by adhering to the bottom face or by the other method. Furthermore, a snaking prevention guide 35, having building-up faces on the right and left of the open belt 33, is provided with the rail means 31, and the guide is guided so as not to get out of both side faces of the crawler 32.

The coming up prevention rail 37 is provided parallel to the rail means 31, away a predetermined height, except the connecting portion with the lower flat portion of the rail means. As shown in FIGS. 4, 7 and 9 in detail, the connecting shafts 6, 19 of the front crawler traveling units 1*a* and 1*b* and the rear crawler traveling units 2*a* and 2*b* further project from these traveling units in right and left and an idler roller 36 is rotatably supported at the projecting portion respectively. One side rollers of the right and left idler rollers 36 (the front portion and the rear portion) contact with the guide rail 37, rotating from the lower so as to prevent the crawler traveling unit from coming up.

The horizontally holding guide rail 21 is in the shape of U, open in the stairs direction, and is biased a predetermined quantity on the lower side of the stairs. On the other hand, a rotating roller 22 is rotatably supported at a predetermined position of the rear portion of the pallet 7, projecting for the side of the right and left respectively. One of the right and the left rotating rollers 22 moves, rotating in the guide rail 21. These guide rail 21, the rotating rollers 22 and the gas springs 23 comprise the horizontally holding structure $H_1$.

Figure 8:
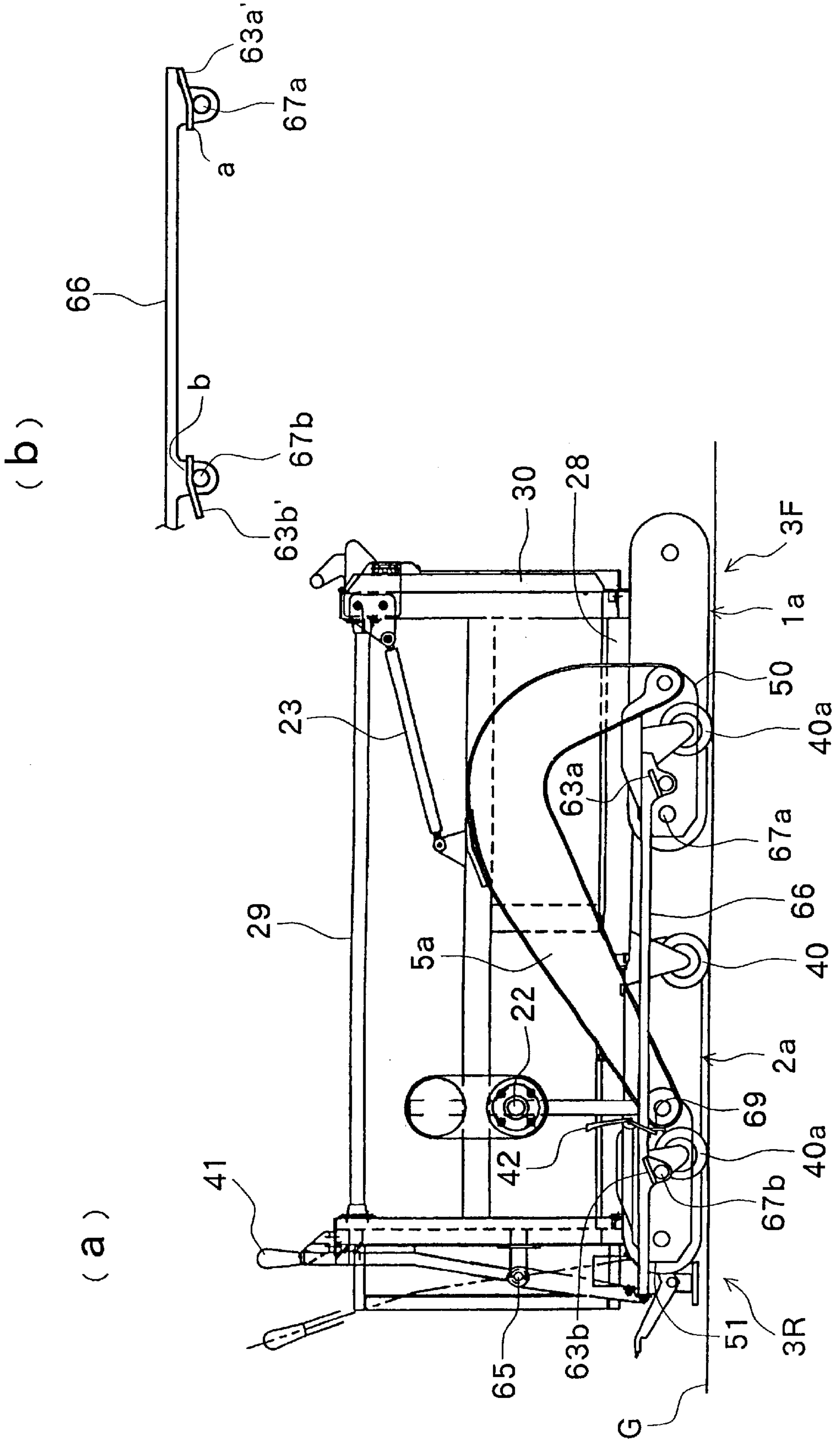
FIG. 8(*a*) is a side view showing an operation means for release of contacting ground of the crawler traveling unit and (b) is a view showing the embodiment having transformations in part.

Besides, as shown in FIG. 8, an operation lever for release contacting ground of the crawler traveling unit 41 is provided with the rear portion of the pallet 7, being free to operate in the front and rear directions by a rotatably support pin 65. The top end of the operation lever 41 is connected with a moving lever 66, slidably supported by the bottom plate of the pallet 7 at the lower hand thereof, and rollers 67*a*, 67*b* are rotatably supported by the moving lever, at the two lugs projecting in the lower hand. On the other hand, as mentioned before, the inclined cam pieces 63*a*, 63*b* are provided with the transmission cases 50, 51 of the front traveling portion 3F and the rear traveling portion 3R, projecting in the side hand, and the rollers 67*a*, 67*b* can contact with the inclined cam pieces, rotating. The numeral 42 in the figure is a toggle clamp provided on the lower portion of the pallet 7, and secures holding the rear traveling portion 3R on the upper by hooking a hook 69 near the rear connecting portion of the support frames 5*a*, 5*b*.

Besides, numeral 70 in FIG. 2 and FIG. 7 is a control panel provided on the rear portion of the pallet 7. The present self-propelled stairs moving unit $A_1$ travels by operating a pendant switch (not shown) connecting with the control panel with a code by an operator. And, a numeral 71 is a foot-operated stopping brake provided on the lower portion of the rear hand of the pallet 7.

Figure 1:
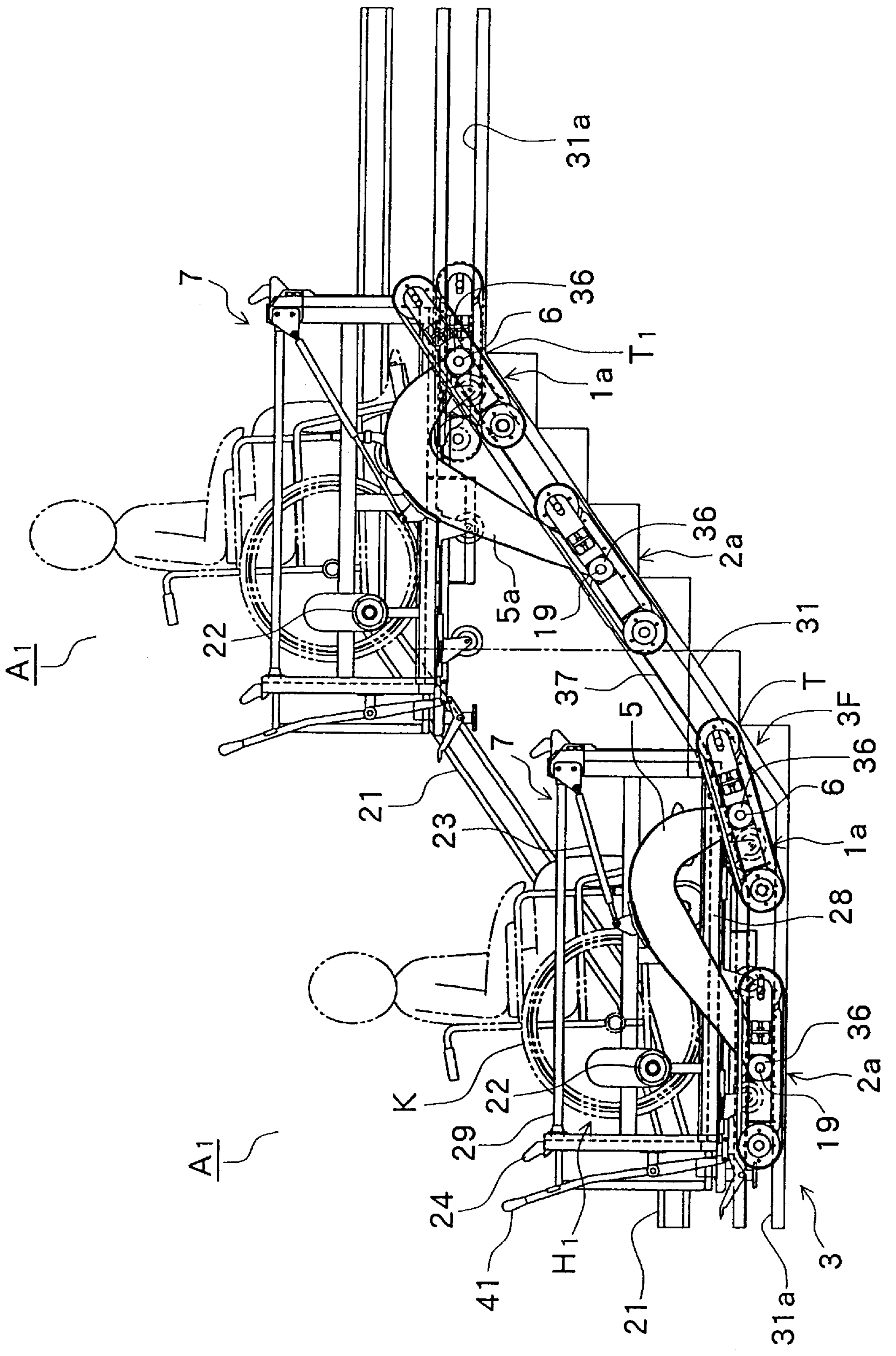
FIG. 1 is a whole side view showing the movements of the form of the first embodiment of a self-propelled stairs moving unit to which the present invention is applied.

Next, the operations of the self-propelled stairs moving unit Al according to the form of the above-mentioned first embodiment will now be explained. Then, the case where the present self-propelled stairs moving unit $A_1$, putting the wheelchair K with a person thereon on the pallet is moved from the lower hand of the stairs to the upper hand, as shown in FIG. 1 for instance, will now be explained. The front crawler traveling unit 1*b* and the rear crawler traveling unit 2*b* in the left hand are fitted on the rail means 31 on the lower plane of the stairs, and the roller 22 is inserted into the guide rail 21. On this occasion, the front and rear rotating rollers 36, 36 also contact with the lower face of the guide rail 37, rotating on it.

In this state, by operating the operation lever 41 in the rear direction, the connection between the self-propelled portion 3 and the pallet 7 is released, and the front and rear electric motors 13, 20 are driven by the pendant switch. By doing so, the front and rear crawler traveling units 1*a*, 1*b*, 2*a* and 2*b* of the right and left rows all travel with the same speed, and the crawler traveling units 1*b*, 2*b* of the left row travel on the rail means 31, being guided. That is, the front and rear crawler traveling units 1*b*, 2*b* advance without slipping by engaging the tooth 32*a* of the outer peripheral face of the rubber crawler 32 with the tooth 33*a* of the open belt 33, without snaking by guiding both side faces of the crawler 32 by the guides 35, 35. And, the front and rear crawler traveling units 1*b* and 2*b* of the left row advance without snaking (obliquely traveling) and slipping by the engagement with the teeth and guidance by the guide as mentioned before even on the rail means 31 provided along the inclination of the stairs.

On the other hand, the front and rear crawler traveling units 1*a*, 2*a* of the right row travel on the flat face and the stairs. On this occasion, the front traveling portion 3F comprised of the front crawler traveling units 1*a*, 1*b* of the right and left and the rear traveling portion 3R comprised of the rear crawler traveling units 2*a*, 2*b* of the right and left are unitedly structured, and are rotatably supported by the support frames 5*a*, 5*b* through the connecting shafts 6, 19. Then, as shown in the left side of FIG. 1, when the front traveling portion 3F is entered in the starting point of the stairs, the front crawler traveling unit 1*a* of the right row is inclined with the same angle with which angle the front crawler traveling unit 1*b* of the left row is inclined by guiding by the rail means 31. Even if a big inclined traveling face is not provide at the front face, the crawler traveling unit 1*a* of the right row rides on the corner portion T of the stairs, and travels on the stairs by hooking the tooth of the crawler 32. In a similar way, the rear crawler traveling unit 2*a* of the right row is also inclined according to the inclination of the rail means 31 of the rear crawler traveling unit 2*b* of the left row, and travels on the stairs.

At the part of the starting point of the stairs, the inclination with respect to the level gradually increases such that the front crawler traveling units 1*a*, 1*b* bridges over the first step. Even in this state, the rear crawler traveling units 2*a*, 2*b* are on the flat face. Then, the line connecting both connecting shafts 6, 19, that is, the angular change of the traveling portion 3 (the support frame 5*a*, 5*b*) is slow. Furthermore, the self-propelled portion advances, and the front and rear crawler traveling units (that is, the self-propelled portion) completely ride on the inclined face of the rail means 31 along the inclination of the stairs, and the inclination of the self-propelled portion increases till it corresponds with the inclination of the stairs. But, the rate of this change (angular velocity) is small, and after the self-propelled portion corresponds with the inclination of the stairs, the angle is maintained such that the rate of the angular change (angular velocity) becomes to be 0.

On this occasion, the pallet 7 is supported with the connecting shaft 6 connecting the support frames 5*a*, 5*b* and the front crawler traveling units 1*a*, 1*b* as its center so as to oscillate, and the rotating roller 22 located at a predetermined position of the pallet 7 is guided by the guide rail 21 so as to rotate thereon. Then, the pallet 7 is always geometrically maintained in level state in spite of the change of inclination of the support frames 5*a*, 5*b* and the self-propelled portion 3.

Figure 10:
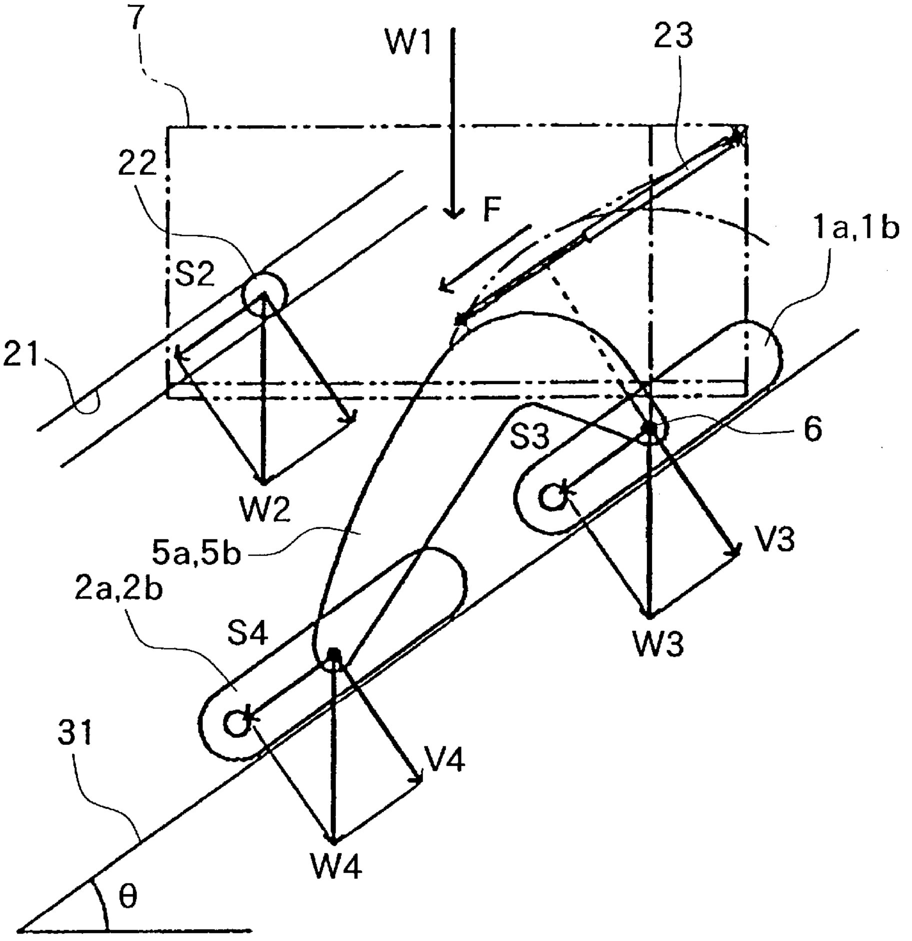
FIG. 10 is a view showing the load state of the self-propelled stairs moving unit.

In this state, as shown in FIG. 10, the load W1 acting on the pallet 7 (the dead load of the pallet plus live load) directly acts on the front crawler units 1*a*, 1*b* through the connecting shaft 6, and at the same time, it acts on the guide rail 21 as the load W2 through the rotating roller 22. The load W3 adding the dead load of the traveling unit to the load from the pallet 7 acts on the front crawler traveling unit. Besides, the component force S2 in the direction of the rotating roller 22 along the guide rail 21 acts on the support frames 5*a*, 5*b* as the compression F of the gas spring 23, and furthermore, acts on the rear crawler traveling units 2*a*, 2*b* as a moment load. On the rear crawler traveling unit, the load W4 adding the dead load of the traveling unit to the moment load through the gas spring acts. That is, the load of the pallet 7 acts, dispersing to the front crawler traveling unit, the rear crawler traveling unit and the guide rail 21. Besides, the pressing forces V3, V4 fully act on the rail means 31 by both crawler traveling units. Then, the contact pressure between the tool 32*a* of the crawler 32 and the tooth 33*a* of the open belt 33 of the rail means 31 is secured. Even if the form of the tooth comprised of pressure angle for smoothly engaging is adopted, coming up owing to the thrust S3, S4 of the crawler traveling unit can be prevented.

As shown in the right side (upper hand) of FIG. 1, when the front crawler traveling units 1*a*, 1*b* reach the top end portion of the stairs, and the connecting shaft 6 which is a center of rotation and the load acting point is over the corner portion of the uppermost step $T_1$, the traveling unit is changed in a level state along the level face of the upper portion from the inclination of the stairs, in a moment, as shown by the chain line from the full line. But, even in this state, the height of the connecting shaft 6 which is the oscillating center of the pallet 7 is not changed, and the pallet 7 is maintained to be level.

Furthermore, the self-propelled portion 3 advances, the front crawler traveling units 1*a*, 1*b* travel on a horizontal portion 31*a* of the rail means and the flat face, and the rear crawler traveling units 2*a*, 2*b* travel on the inclined portion of the stairs of the rail means 31, thereby the line connecting both connecting shafts 6, 19 of the support frames 5*a*, 5*b* (the self-propelled portion 3) changes in its angle so as to gradually being close to level. This angle change continues till the rear crawler traveling units 2*a*, 2*b* position on the horizontal portion 31*a* of the rail means and the flat face, but its change rate (angle velocity) is small.

The front portion of the pallet 7 is supported by the connecting shaft 6 being free to oscillate and the rotating roller 22 is guided by the guide rail 21 with the advance of the self-propelled portion 3, thereby the pallet 7 is maintained to be level. But, as mentioned before, since the angular change of the self-propelled portion 3 is gentle, the angular change rate with the pallet 7 is small. Then, the pallet 7 is certainly maintained to be level.

Even if coming up force acts on the crawler traveling unit by the speedup in the moving speed in the horizontal direction of the rear crawler traveling unit with respect to the front crawler traveling unit, or by acting acceleration in accelerating or decelerating direction during going the stairs up and down, or the like when the self-propelled stairs moving unit $A_1$is moved, for instance, when it is moved from the even face of the lower side to the stairs, the front crawler traveling unit and the rear crawler traveling unit are certainly prevented from coming up from the rail means 31 since the idler rollers 36, 36 supported by the connecting shafts 6, 19 are contacted with the lower face of the guide rail 37 so as to rotate. Then, the engagement of the tooth 32*a* with the tooth 33*a* of the open belt 33 and the guidance with the snaking prevention guide 35 of the side of the open belt 33 are secured such that both crawler traveling units 32 certainly travel.

In the above-mentioned explanation, going the stairs from the lower to the upper was explained. Similar operation acts on the case of going the stairs from the upper hand to the lower hand except that the wheelchair is loaded in the state opposite to the figure for the advance direction. That is, the self-propelled portion advances with the rear portion as its front hand (going backward), one crawler traveling unit travels on the rail means with no slip, and the other crawler traveling unit together travels on the stairs while oscillating. Besides, even on the transferring portion between the even face and the stairs, the angular change of the self-propelled portion comprised of the front and the rear crawler traveling units is small, and the pallet 7 travels, maintained to be level by the guidance of the rotating roller 22 by the guide rail 21.

In the form of the above-mentioned embodiment, the projecting length of the guide rail 21 in the lower side even face is bigger since the rotating roller 22 is located on the rear portion of the pallet 7. But, the projecting length of the guide rail can be decreased or can be removed by locating the rotating roller on the front hand of the pallet.

Subsequently, the transfer of the present self-propelled stairs moving unit Al (the unit according to the form of the other embodiment mentioned hereinafter is similar way) on the even face will now be explained. When the operation lever 41 is in the rear hand (the position of the chain line of FIG. 8(*a*) and the state of FIG. 1), the moving lever 66 is on the position of front hand, and the front and rear rollers 67*a*, 67*b* are not abutted on the inclined cam pieces 63*a*, 63*b* located on the transmission cases 50, 51. In this state, the self-propelled portion 3 and the pallet 7 are connected by the connecting shaft 6, free to oscillate, both do not tow each other. As mentioned above, the pallet 7 and the self-propelled portion 3 travel, changing the angle. When the pallet 7 is not restricted by the guide rail 21 or the like, in general, the front crawler traveling units 1*a*, 1*b* contact with the ground only in its rear portion (the driving wheels 15*a*, 15*b* side), and the rear crawler traveling units 2*a*, 2*b* contact with the ground in whole by the compression of the gas spring 23 although it may be different owing to the live load of the pallet.

When the operation lever 41 is forwardly operated (the full line position from the chain line position) by an operator in the above-mentioned state as shown in FIG. 8(*a*), the moving lever 66 moves backward, and the rollers 67*a*, 67*b* rotatably supported by its front and rear lug portions also move together. Then, the rollers 67*a*, 67*b* contact with the inclined cam pieces 63*a*, 63*b* (see FIGS. 5 and 6) provided on the sides of the transmission cases 50, 51 so as to project, and are moved along the cam pieces so as to hold up the transmission cases 50, 51 in the upper hand. Then, the front traveling portion 3F and the rear traveling portion 3R are held up, and the front and rear crawler traveling units of right and left are removed from the level face G, and the front and rear casters 40*a*, 40*a* of the right and left two rows and center fixed wheel 40 provided on the lower portion of the pallet 7 contact with the ground. Furthermore, the right and left toggle clamps 42 are rotated by hooking on the hook 69 so as to certainly maintain the rear crawler traveling units 2*a*, 2*b* on the upper positions.

In this state, an operator can move the stairs moving unit to an optional place on a level face, freely changing directions with the front and rear casters 40*a*, 40*a*, by grasping and pushing the handle 24. Then, positioning of the stairs moving unit, that is, fitting one of the right and left crawler traveling unit on the rail means 31 and engaging the rotating roller 22 with the guide rail 21, can be easily and immediately executed in the state that the wheelchair K is loaded on the pallet 7. Furthermore, an operator can freely move, changing directions while the wheelchair is loaded, on the level face of the lower side, the center landing of the stairs, the level face of the upper side, an underground path and the path of an arc bridge. Next, the embodiment where a part is changed will now be explained. The manual movement of the stairs moving unit may be too heavy even on a level face when there are irregular portions, such as braille block, especially when the stairs moving unit is started from the irregular portion, and in the heavy load state when an electric wheelchair is loaded on the pallet. In this case, preferably, one of the front and rear crawler traveling units is contacted with the ground so as to use the power travel of the crawler traveling unit as assistance. For instance, the rear inclined cam piece 63*b* is provided on the loose inclined face or level face, furthermore, the cam piece 63*b* itself is removed, and the front crawler traveling units 1*a*, 1*b* are exclusively held up with the operation of the operation lever 41 so as to release contacting the ground. By doing so, the front crawler traveling units 1*a*, 1*b* are held up in the state that the rear crawler traveling units 2*a*, 2*b* are contacted with the ground, and an operator freely changes directions with the front casters 40*a*, and the stairs moving unit can be easily moved with one operator even in the heavy load state on the irregular face, such as braille blocks, with assistance of the driving force with the electric motor 20 of the rear crawler traveling unit. When contacting ground is released by holding up the rear crawler traveling unit, it can be held on the holding up position by operating the toggle clamp 42.

Furthermore, an another embodiment will now be explained in accordance with FIG. 8(*b*). In the present embodiment, the forms of front and rear inclined cam pieces 63*a*', 63*b*' are changed, and the operation lever 41 is operable and fixed on three positions. That is, an even portion a is provided with the lower portion of the front inclined cam piece 63*a*', and an even portion b is provided with the upper portion of the rear inclined cam piece 63*b*' Then, at the forward position by one step from the release position (the chain line position of FIG. 8(*a*)) of the operation lever 41, the front roller 67*a* is moved to the boundary of the even face a along the inclined face of the front inclined cam piece 63*a*', and the rear roller 67*b* is moved to the boundary of the inclined face along the even portion b of the rear inclined cam piece 63*b*'. In this state, in similar to the above-mentioned, the front self-propelled portion 3F is held up so as to contact the caster 40*a* with the ground, but the rear self-propelled portion 3R is not held up so as to contact the rear crawler traveling unit with the ground. Furthermore, when the operation lever 41 is operated forward one more step, the front roller 67*a* is moved along the even face a of the front inclined cam piece 63*a*', the front self-propelled portion is maintained in held-up state. The rear roller 67*b* is moved along the inclined face of the rear inclined cam piece 63*b*', and the rear self-propelled portion is held up so as to contact the rear caster 40*a* and the center fixed wheel 40 with the ground.

As shown in FIG. 3, in order to put a wheelchair on or off the pallet 7 at a predetermined position in an even face, the extending plates 30 in the front of the pallet are moved downward, being rotated, taking off the latch, in the state the unit is stopped by footing the foot operated brake 71. And, the top end lateral bar 38 is contacted with the ground, and two folded plates 30*a*, 30*b* are extended so as to make relatively longer right and left extending plates. By doing so, the wheelchair K can be easily put on and off the pallet 7 with the extending plates 30*a*, 30*b*. On this occasion, the wheelchair K is put on , facing the advance direction of the self-propelled stairs moving unit , and a person on the wheelchair always faces the advance direction in spite of going up or down of the stairs.

Subsequently, the form of the second embodiment of the present invention will now be explained in accordance with FIG. 13 through FIG. 16. On this occasion, the explanation of the same part of the form of the embodiment explained heretofore is omitted, by attaching with the same mark. In the form of the above-mentioned embodiment, the guide rail 21 for the horizontally holding structure $H_1$ of the pallet 7 is necessary, adding the rail means 31 on the side of the stairs. The guide rail may injure the convenience on usual use of the stairs since a predetermined length extends on the even face of the up and down ends of the stairs. Especially, in case of the rush hours at a station, the guide rail may injure the passage. Then, in the form of the present embodiment, it is characteristic that the horizontally holding structure $H_2$ for holding the pallet to be level is used without using the guide rail.

A bracket 75 is fixedly provided with the support frames 5*a*, 5*b*, and top end portions 26*a* of right and left motor cylinder units 26 are rotatably connected with the bracket 75. The base ends having motors 26*b* of the right and left motor cylinder units 26 are rotatably connected with predetermined positions of the pallet 7. On the other hand, a horizontal sensor 25 (horizontal detecting means), such as a gas rate gyro, a vibration gyro, and a weight, is provided with the lower portion of backward of the pallet 7. With the horizontal sensor, the level rate of the pallet 7, in concrete, the inclined angle from the horizontal angle (o degree) with the connecting shaft 6 can be detected from the angular acceleration (or angle velocity) or directly.

The control portion in the control panel 70 receives a signal from the horizontal sensor 25 and outputs a predetermined signal to the motor cylinder unit 26 so as to hold the pallet 7 to be level in spite of the angular change of the self-propelled portion 3 (and the support frame 5*a*).

According to the form of the present embodiment, one of the right and left crawler traveling unit travels, guided engaging with the tooth of the guide rail 31 by driving the self-propelled portion 3, and the other of the right and left crawler traveling unit, united with one crawler traveling unit goes up and down the stairs. On this occasion, as shown in the left side (lower hand) of FIG. 13, in case of transfer from the even face to the starting point of the stairs, in first, the front crawler traveling units 1*a*, 1*b* are inclined so as to bridge the first step, and they are put on the inclined face of the rail means 31. With the advance of the stairs moving unit $A_2$, the inclined angle of the self-propelled portion 3 (and the support frames 5*a*, 5*b*) is gradually increased, but its change rate is small. For this reason, the rotational speed of the motor cylinder unit 26 controlled so as to be shrunk on the basis of the signal from the horizontal sensor 25 may be slow, so the pallet 7 can be held to be level, corresponding to the signal from the horizontal sensor 25.

And, when the rear crawler traveling units 2*a*, 2*b* are also completely put on the inclined portion of the rail means 31, the inclined angle of the self-propelled portion 3 becomes to be constant angle along the inclined angle of the stairs. In principle, there is no detection of angular change with the horizontal sensor 25, and then the motor cylinder unit 26 is held at a constant position.

Figure 13:
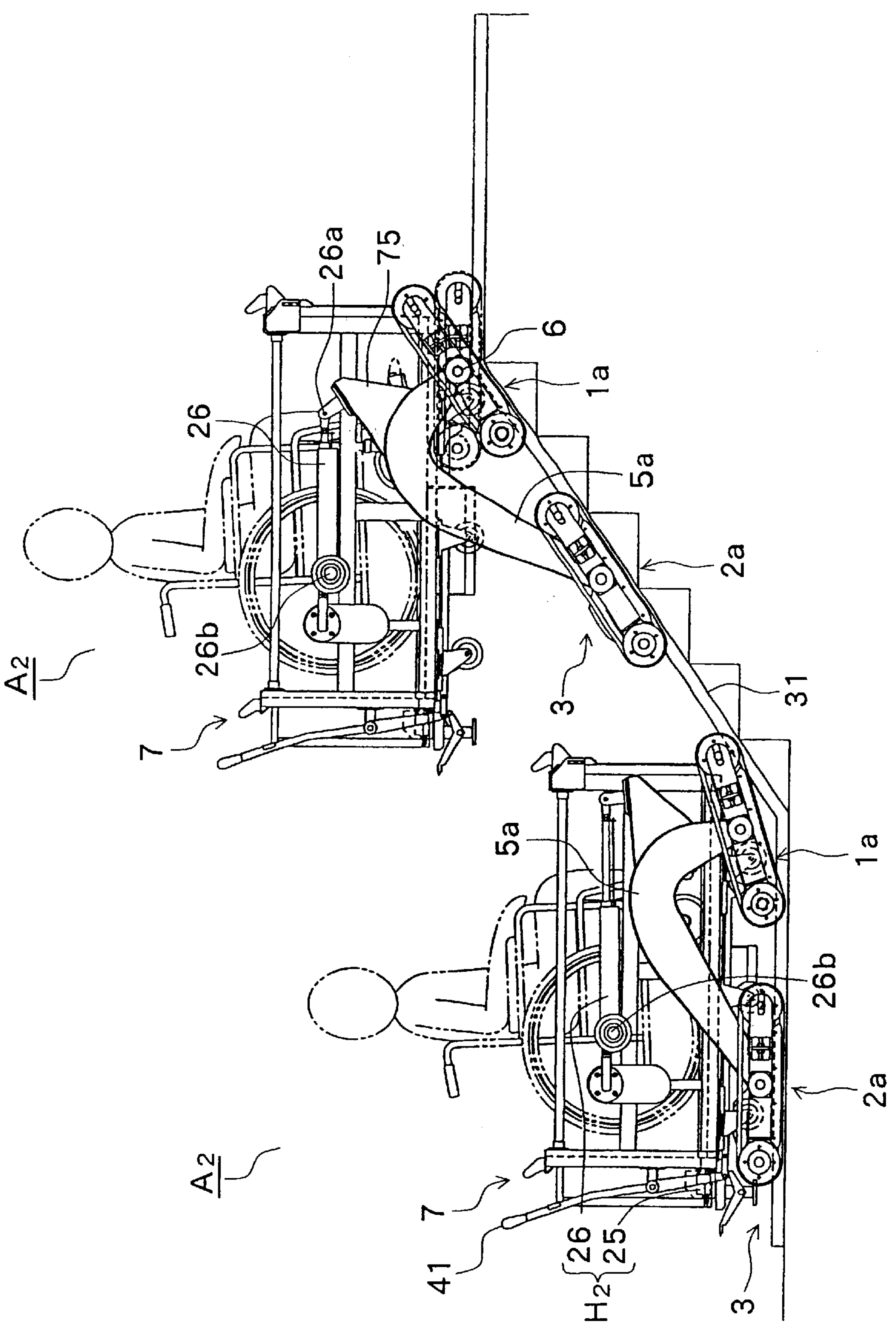
FIG. 13 is a whole side view showing the movements of the form of the second embodiment of a self-propelled stairs moving unit to which the present invention is applied.
Figure 14:
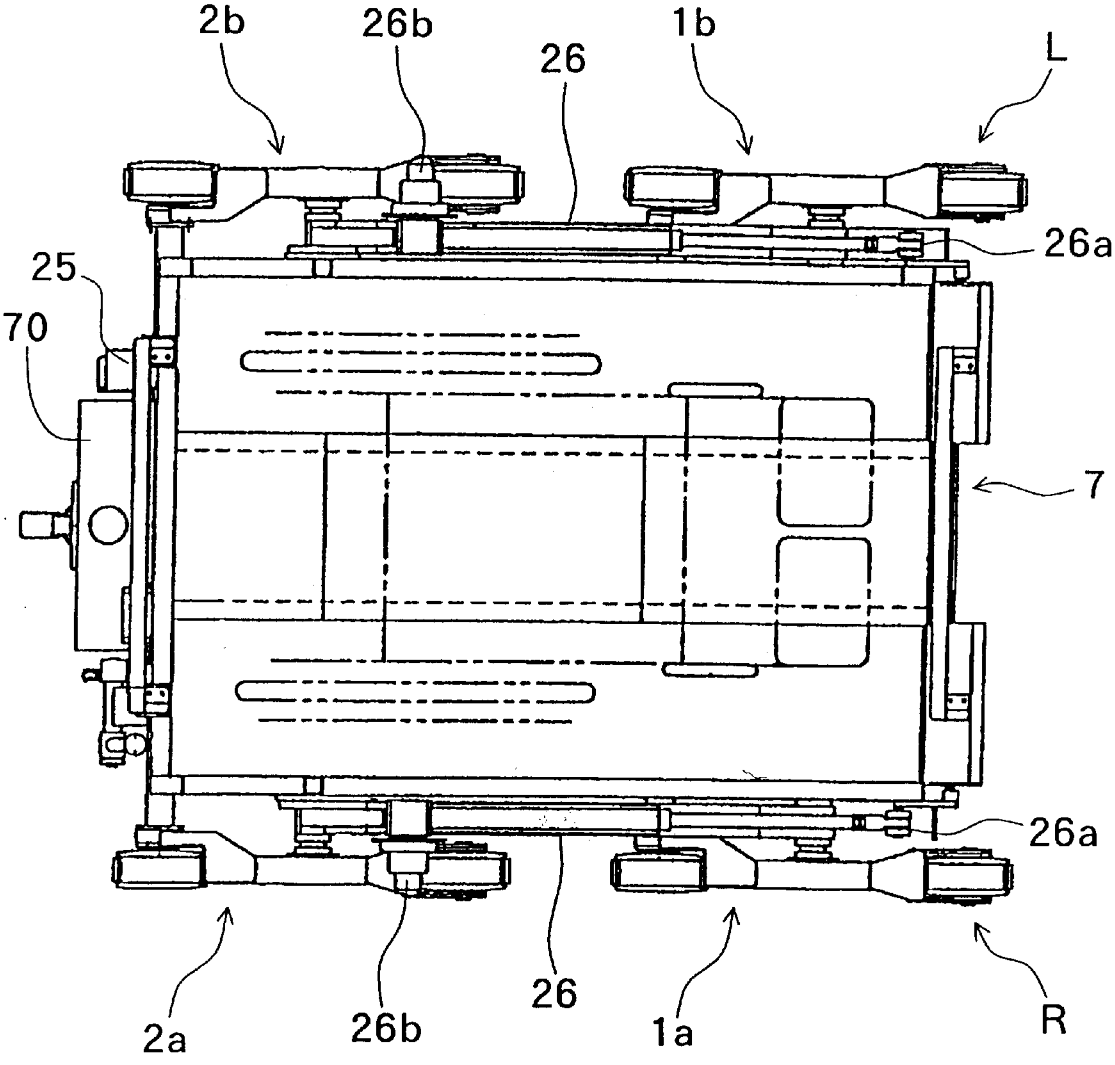
FIG. 14 is a plan view of the self-propelled stairs moving unit of FIG. 13.
Figure 15:
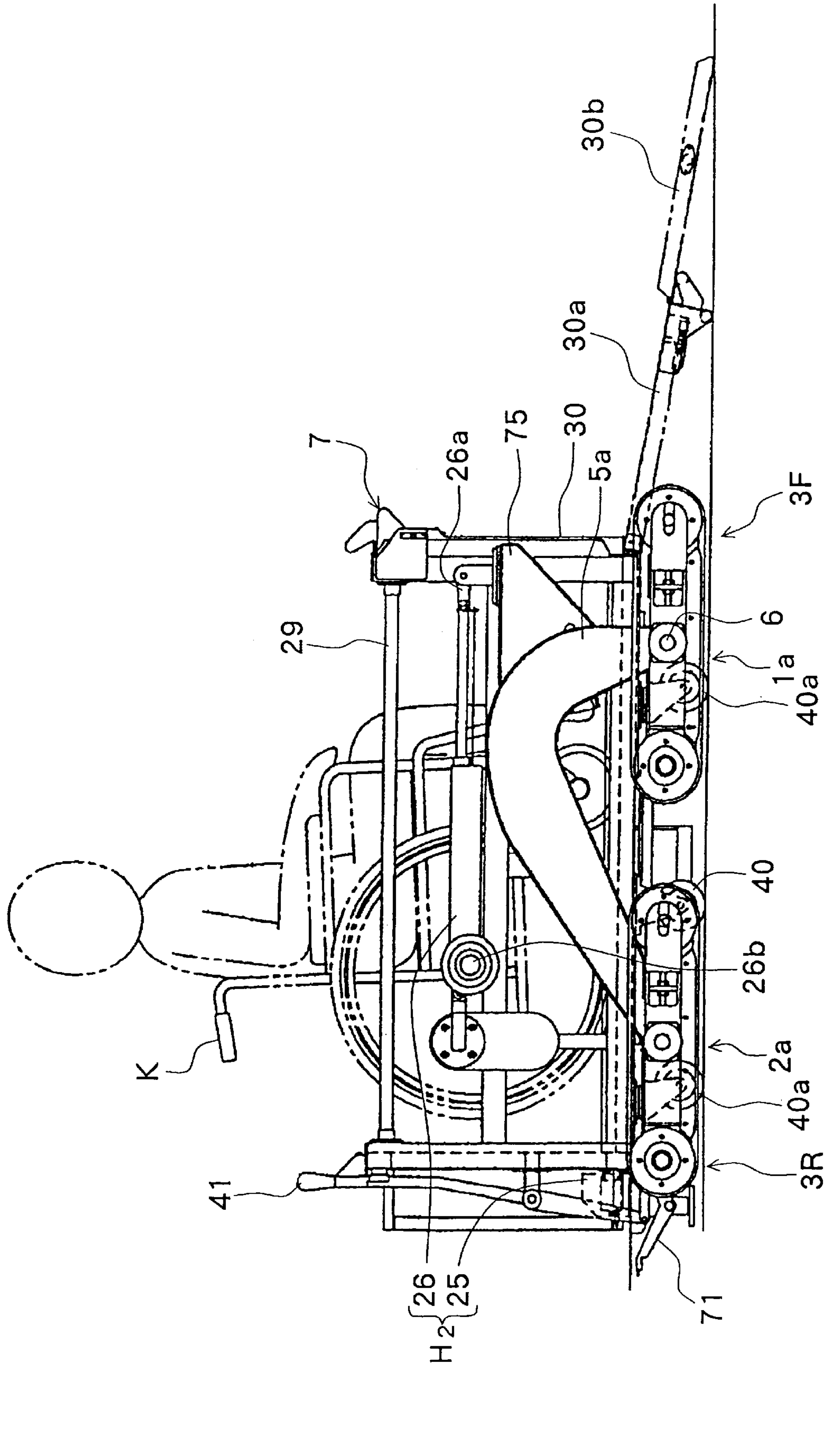
FIG. 15 is a side view of the self-propelled stairs moving unit of FIG. 13.
Figure 16:
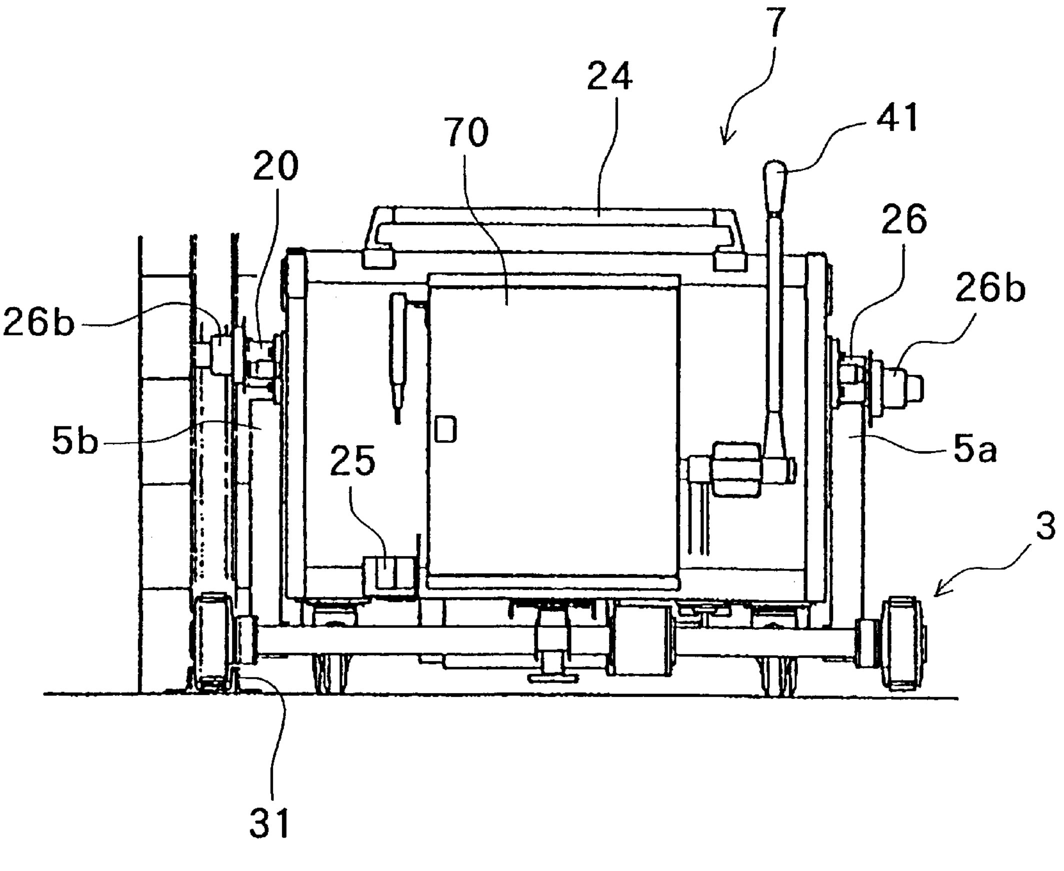
FIG. 16 is a back view of the self-propelled stairs moving unit of FIG. 13.

Furthermore, as shown in the right side (the upper portion) of FIG. 13, when the front crawler traveling units 1*a*, 1*b* reach the uppermost portion of the stairs, and the connecting shaft 6, which is a center of rotation and is also a center of oscillation of the pallet 7 passes the uppermost corner portion, the front crawler traveling units are changed into the level state from the inclined angle of the stairs in a moment, but the angular relation between the support frames 5*a*, 5*b* and the pallet 7 is not changed. Then, the motor cylinder unit 26 has a constant length, and the pallet 7 is maintained to be level. Furthermore, the angle of the self-propelled portion (support frame) is gradually changed so as to close to the level direction with the advance of the stairs moving unit $A_2$, but the rate of this change (angular velocity) is small, and the motor cylinder unit 26 is relatively slowly extended, corresponding to the signal from the horizontal sensor 25 so as to hold the pallet 7 in level state. When the rear crawler traveling units 2*a*, 2*b* are completely on the even face and the self-propelled portion 3 (the support frames 5*a*, 5*b*) becomes to be level, the extension of the motor cylinder unit 26 is stopped so as to maintain the pallet 7 to be level.

On this occasion, the explanation is done in accordance with FIG. 10. Since forces V3, V4 pressing on the rail means 31 always act on the front crawler traveling units 1*a*, 1*b* and the rear crawler traveling units 2*a*, 2*b* with the moment load through the motor cylinder unit 26, no coming up prevention rail 37 may be provided. In the form of the present embodiment, the coming up prevention rail 37 is preferably omitted since the guide rail 21 as a horizontally holding structure is omitted. Accordingly, the rotating roller 22 and the idler roller 36 are also omitted. Since the coming up prevention guide 37 positioned on the inclined face of the stairs is not hindrance, the guide rail is provided on this part and only the part corresponding to the even face may be omitted. Furthermore, preferably, the projection of the rail means 31 from the even face is made smaller or is removed. Then, preferably, the open belt 32 is provided in the ditch on the even face so as to match the upper end of the snaking prevention guide 35 with the even face or so as to make its projection height lower. Furthermore, the snaking prevention guide 35 may be made lower or may be removed only on the even face. Besides, the length of the rail means 31 itself on the even face may be made the length corresponding to the length to the front or rear crawler traveling unit from the boundary of the inclined face, that is, the length under the two steps of the stairs from the boundary so as to engage only the crawler traveling unit hanging over the rail means inclined face with the rail means at the time of self-propelling.

Besides, the release of contacting the ground of the crawler traveling units 1*a*, 1*b*, 2*a*, 2*b* is executed with the above-mentioned operation lever 41 or the like. Especially, the contacting ground of the rear crawler traveling units may be released by controlling the motor cylinder unit 26 so as to be shrunk or extended with a pendant switch (not shown) extending from the control panel 70. That is, the motor cylinder unit 26 is held at the position where the pallet 7 is in almost level state and the rear crawler traveling units 2*a*, 2*b* contact with the ground so as to perform the above-mentioned crawler traveling on the even face (the movement of the front portion with the casters 40*a* and the rear portion by driving the crawler traveling units 2*a*, 2*b*). Furthermore, the motor cylinder unit 26 is slightly shrunk so as to hold up the rear crawler traveling unit, and the rear casters 40*a* and the fixed wheels 40 are contacted with the ground so as to move the stairs moving unit, manually.

Subsequently, the form of the third embodiment further changed will now be explained in accordance with FIG. 17 through FIG. 19.

The feature of the form of the present embodiment is that the horizontally holding structure $H_3$ of the pallet is easily controlled with no delay and hunting with the programming control using a detecting means, such as a potentiometer having high credibility.

Figure 17:
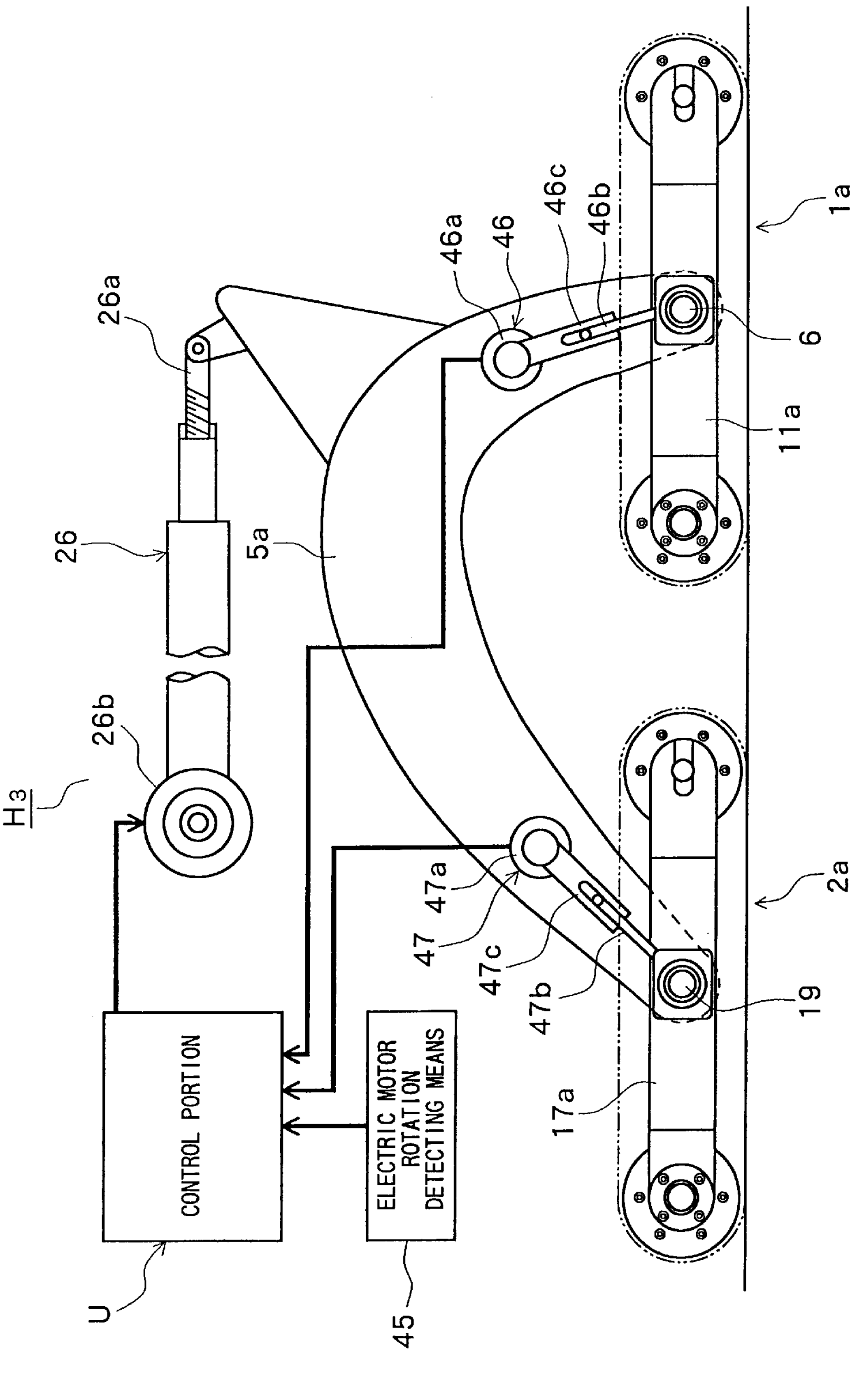
FIG. 17 is a rough side view showing a horizontally holding structure according to the form of the third embodiment of the present invention.

The horizontally holding structure $H_3$ according to the form of the present embodiment has the motor cylinder unit 26, a means 45 for detecting the rotational number of the electric motor of the self-controlled portion 3, a means 46 for detecting the rotational angle around the connecting shaft 6 of the front crawler traveling unit 1*a* with respect to the support frame 5*a*, a means 47 for detecting the rotational angle around the connecting shaft 19 of the rear crawler traveling unit 2*a* with respect to the support frame 5*a*, and a control portion U for inputting signals from the respective means 45, 46, 47 (the stairs position detecting means) and outputting to the motor cylinder unit 26 along the program set (stored) in advance, as shown in FIG. 17.

The detecting means 45 is comprised of a sensor for detecting the electric pulse of the control panel or a speed indicator for detecting the rotational number of the motor output shaft or the driving shafts 10, 16 in order to detect the rotational number of the output shaft of both or one of the electric motors 13, 20, such as a brushless DC motor, of the front traveling portion 3F and the rear traveling portion 3R. Besides, the front and rear angle detecting means 46, 47 for detecting the rotational angle of the front and rear crawler traveling units are provided with one of right and left, and have potentiometers 46*a*, 47*a* provided on the support frame 5*a* and sensor bars 46*b*, 47*b* which are fixed in an end by the front and rear truck frames 11*a*, 17*a*, extending in the frame direction. And, the top end bending portion of these sensor bars is slidably engaged with the engagement ditch formed at the arms 46*c*, 47*c* of respective potentiometers 46*a*, 47*a*.

Figure 18:
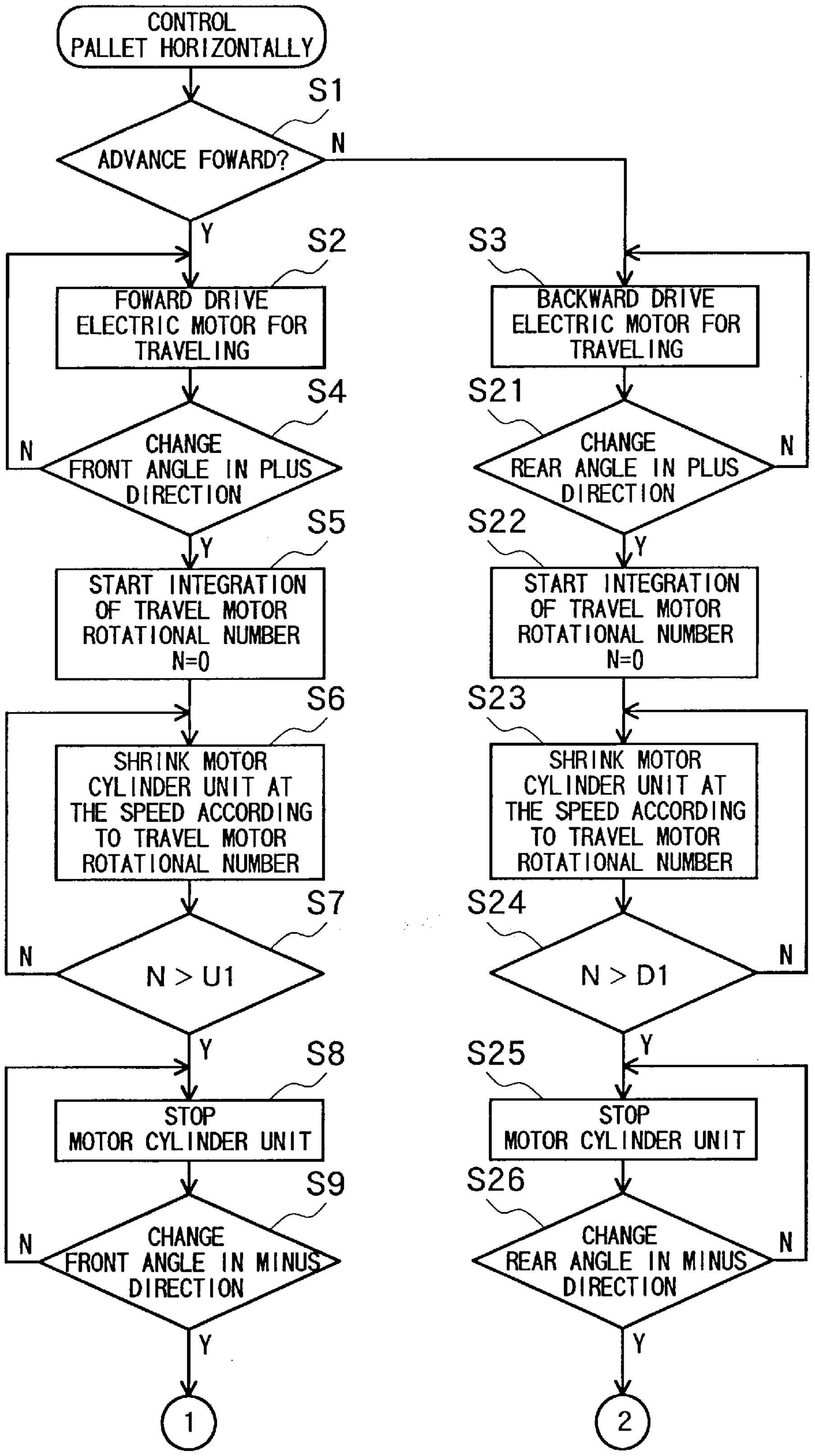
FIG. 18 is a flowchart showing operations of the horizontally holding structure of FIG. 17.
Figure 19:
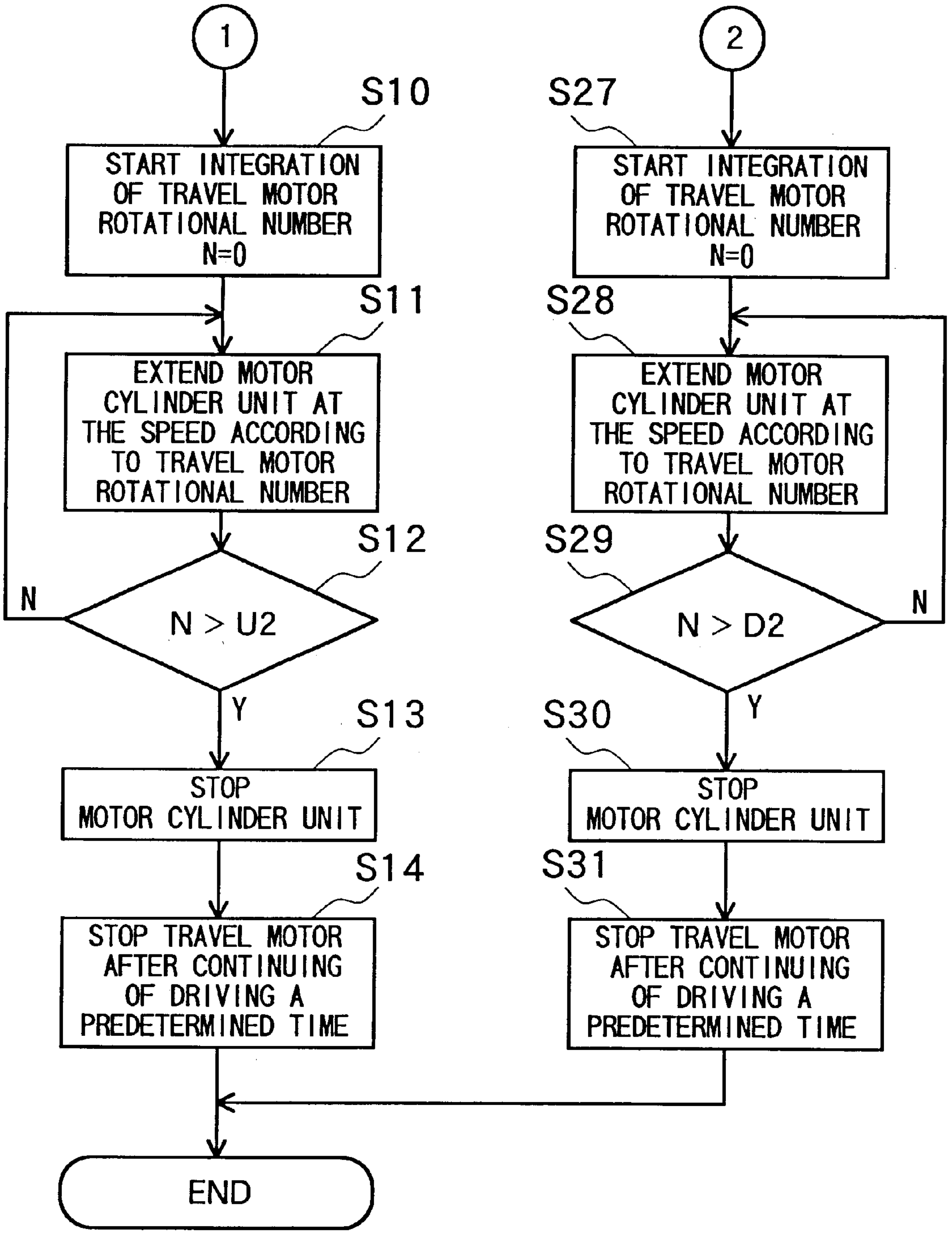
FIG. 19 is a flowchart showing the continuation of FIG. 18.

Subsequently, the operations of the self-propelled stairs moving unit using the present horizontally holding structure $H_3$ will now be explained along the flowchart as shown in FIGS. 18 and 19. At first, by the operation by an operator, the judgement as to whether the advance of the stairs moving unit is a forward direction (going up direction of the stairs) or a backward direction (going down direction of the stairs) is executed (S1). If it is a forward direction, the front and the rear electric motors for traveling 13, 20 are rotated in the advance (positive) direction (S2), and if it is a backward direction, the above-mentioned electric motors are rotated in the backward (negative) direction (S3) so as to travel the front and rear crawler traveling units 1*a*, 1*b*, 2*a*, 2*b*.

In case of forward direction traveling, when the top ends of the front crawler traveling units 1*a*, 1*b* hang over the inclined face of the rail means 31, the crawler traveling unit which is short in the front and back directions, rotating with its central connecting shaft 6 as its center, rotate with bigger rotational angle in comparison with the rotation of the support frame 5*a* with the rear connecting shaft 19 as its center, and rotate in the plus (anti clockwise in figure) direction relative to the support frame 5*a*. The change of this rotational movement is detected with the potentiometer 46*a* through the sensor bar 46*b* fixed by the truck frame 11*a* and the arm 46*c* (S4). Then, the integration of the rotational number of the electric motors for traveling 13, 20 detected with the detecting means 45 is started from the point when the angular change of the potentiometer 46*a* (that is, the front angle detecting means 46) is detected (N=0; S5). Furthermore, the electric motor 26*b*, such as a synchronous motor and a stepping motor, is rotated with the speed according to the rotational number of the electric motor so as to start shrinking the motor cylinder unit 26 (S6).

Usually, the present self-propelled stairs moving unit is used at a fixed place, such as a station. Even if there are many stairs to each platform at a station, the inclined angle of the stairs is generally constantly designed. Then, the inclined angle of the stairs is set in the control panel 70 in advance, and by this setting, the rotational number of the electric motors for traveling 13, 20 and the rotational number of the motor 26*b* of the motor cylinder unit for horizontally controlling 26 are related to each other (linked with each other) Accordingly, the pallet 7 is always held to be level although the support frame 5*a* (the self-propelled portion 3) is inclined since the motor cylinder unit 26 is shrunk, corresponding to the movement quantity of the self-propelled portion 3 advancing with no slip with the engagement between the crawler 32 and the rail means 31.

The driving of the motor cylinder unit is continued till the integration rotational speed N of the electric motor for traveling exceeds a predetermined number U1, that is, a predetermined integration rotational number U1 corresponding to the distance till the self-propelled portion 3 (the line connecting both connecting shafts 6, 19 of the support frame) corresponds with the inclination of the rail means after the top ends of the face contacting ground of the front crawler traveling units 1*a*, 1*b* are started to put on the inclined face of the rail means 31 and the rear ends of the face contacting ground of the rear crawler traveling units 2*a*, 2*b* are put on the inclined face of the rail means (N>U1) (S7). When the integration rotational number N exceeds the above-mentioned predetermined number, the shrinkage driving of the motor cylinder unit is stopped (S8). Furthermore, the traveling (going up) of the self-propelled portion 3 along the inclination of the stairs is continued. On this occasion, the motor cylinder unit 26 is in a stop state and the pallet 7 is stably held to be level.

When the connecting shaft 6 portion of the front crawler traveling units 1*a*, 1*b* reach the upper end portion of the stairs (see FIG. 1 and the right side (upper hand) portion of FIG. 13), the front crawler traveling unit is widely rotated in the minus (clockwise in figure) direction with the connecting shaft 6 as its center in a moment (S9). Then, in a similar way to the above-mentioned, the rotation of the front crawler traveling unit is changed with respect to the support frame 5*a*, and the change of the rotation movement is detected by the potention meter 46*a* (the front angle detecting means 46). And, in a similar to S5, the integration of the rotational number of the electric motor for traveling is started (N=0; S10), and the driving of the motor cylinder unit 26 is started in the extension direction (S11). The driving of the motor cylinder unit is set at the speed according to the rotational number of the electric motor for traveling in similar to the above-mentioned. Then, the electric cylinder unit extends at a predetermined speed as the angle of the support frame 5*a* (the self-propelled portion 3) is gradually changed so as to be close to be level, and then the pallet 7 is always held to be level.

Furthermore, when the self-propelled portion 3 advances, the connecting shaft 19 of the rear crawler traveling units 2*a*, 2*b* go over the upper end corner portion of the stairs, the crawler traveling unit is rotated in a level state, and the self-propelled portion becomes to be level, the integration value of the rotational speed of the electric motor is over the predetermined value (N>U2; S12) since the predetermined integration value U2 of the rotational number of the electric motor for traveling is set so as to correspond to the distance of both connecting shafts 6, 19 of the front and rear crawler traveling units. Then, the driving of the motor cylinder unit 26 is stopped (S13). In this state, the self-propelled portion 3 and the pallet 7 are almost parallel to each other, and the pallet is held to be level.

After the rear ends of the rear crawler traveling units leave the upper end corner portion of the stairs, the driving of the electric motor for traveling is continued for a predetermined time or at a predetermined integration rotational number so as to advance a predetermined distance that safety is secured, the electric motor is stopped (S14). Then, the control of going up of the stairs finishes.

On the other hand, when the advance of the stairs moving unit is judged to be backward (going down direction of the stairs) at step S1, the electric motors for traveling 13, 20 are driven in the backward (negative) direction so as to backward travel the self-propelled portion 3 (S3). When the connecting shaft 19 of the rear crawler traveling units 2*a*, 2*b* goes over the upper end corner portion of the stairs and the traveling units are rotated in the plus (anti-clockwise) direction with the connecting shaft 19 as its center, the change of the rotation movement is detected by the rear angle detecting means 47 (S21). That is, the truck frame 17*a* is rotating moved with the connecting shaft 19 as its center by the rotation of the rear self-propelled portion, the potentiometer 47*a* provided with the support frame 5*a* is rotating moved by the sensor bar 47*b* united with the shaft 19 through the arm 47*c*, and the change of rotation movement is transferred to the control portion U.

At the same time, the integration of the rotational number of the electric motor for traveling is started (N=0; S22), and the driving of the motor cylinder unit 26 is started in the shrinkage direction (S23). The driving of the motor cylinder unit is interlocked with the rotational number of the electric motor for traveling. Since the load on the pallet 7 and the dead load of the stairs moving unit energize the advance direction in the going down direction of the stairs, the rotational speed of the electric motor for traveling is made faster in comparison with the going up direction of the stairs acting the above-mentioned load as a load. Then, the movement of the motor cylinder unit is also made faster with the rotational speed of the electric motor.

When the integration value N of the rotational number of the electric motor is over the predetermined integration value D1 (≈, U2) almost corresponding to the distance of both connecting shafts 6, 19 of the front and rear crawler traveling units (N>D1; S24), the motor cylinder unit 26 is stopped (S25). In this state, the front crawler traveling units 1*a*, 1*b* are on the inclined portion of the stairs, and the self-propelled portion 3 has a constant inclined angle, and the self-propelled portion 3 is traveled (backward movement) in the going down direction of the stairs in the state the pallet 7 is held to be level.

When the top end portions contacting ground of the rear crawler traveling units 2*a*, 2*b* reach the even face of the lower hand of the stairs (the even face of the rail means), the rear crawler traveling units 2*a*, 2*b* are rotated with the bigger change quantity in comparison with the rotation movement of the support frame 5*a*. That is, although the support frame 5*a* is rotated with the rear connecting shaft 19 as its center, the rear crawler traveling unit is rotated with the central connecting shaft 19 as its center. The relative angular change of both is detected as the angular change in the minus (clockwise) direction by the potentiometer 47*a* (the rear angle detecting means 47) (S26). Then, the integration of the rotational number of the electric motor for traveling is started (N=0; S27), and the driving of the motor cylinder unit 26 is started in the extension direction (S28). The driving of the motor cylinder unit is controlled, interlocking with the rotational number of the electric motor for traveling. The pallet 7 is always held to be level in spite of the angular change of the self-propelled portion 3 (the support frame 5*a*).

Furthermore, when the self-propelled portion advances, the integration quantity of the rotational number of the electric motor for traveling is over the predetermined value D2 (≈U1) almost corresponding to the distance from the front end portion contacting ground (the front end in the advance direction) of the rear crawler traveling unit to the rear end portion contacting ground of the front crawler traveling unit (N>D2; S29), the driving of the motor cylinder unit is stopped (S30). Furthermore, the driving of the electric motor for traveling is maintained for a predetermined time or with a predetermined integration rotational number, and the electric motor is stopped at the place a predetermined distance far from the lower end of the stairs (S31). Then, the control of going down of the stairs finishes.

Since the distance of the moving portion is different at the upper end side and lower end side of the stairs in the transfer portion between the stairs and the even face, the coefficient which the electric motor for traveling and the motor cylinder unit motor for horizontally holding are related with each other is different. Furthermore, the advance speed of the self-propelled portion and the change rate (angular velocity) of the inclination of the support frame (self-propelled portion) do not become to be linear in each position of the trasfer portion. Then, the control portion is programmed to compute to make the pallet to be level in each position of the self-propelled portion, or a map is stored in the control portion on the basis of the integration rotational number of the electric motor for traveling, the control portion is programmed to always keep the pallet to be level in spite of each position of the transfer portion.

According to the horizontally holding structure H3 the above-mentioned, the relation of the self-propelled portion 3 with respect to the stairs and the motor cylinder unit 26 are controlled by the detection of the angular change of the front angle detecting means 46 or the rear angle detecting means 47 and by the traveling electric motor rotation detecting means 45. Accordingly, the pallet 7 is correctly and certainly held to be level without hunting by controlling along the program set in advance, without feedback, then fears are not given to the person riding on the wheelchair. Furthermore, since the movement direction of the motor cylinder unit is changed by the rotational movement of the front or the rear angle detecting means 46, 47 in the plus direction or in the minus direction, there in no error operation and certain control having high safety is possible, together with the angle detecting means having high credibility, such as a potentiometer.

On this occasion, the detection of the angular change with the above-mentioned potentiometer has a predetermined neutral zone. So, by the slight angular change with the engagement relation between the tooth of the crawler and the tooth of the rail means on the inclined face of the stairs, signals, such as steps S4, S9, S21, S26 are not output. Besides, the front and rear angle detecting means is not always the above-mentioned potentiometer. For instance, the angular change of the lower end portion and the upper end portion of the stairs may be detected by the two sensor cams and two limit switches respectively.

In the form of the above-mentioned embodiment, the finish of the transfer between the stairs and the even face is judged by the integration rotational number of the electric motor for traveling. But, this is not the best one. No change of the angular change of the crawler traveling unit of the advance direction rear side may be judged by detecting with the front or rear angle detecting means 46, 47. That is, the steps S7, S12 may be changed into "the rear angle change becomes to be 0" and the steps S24, S29 may be changed into "the front angle change becomes to be O". Besides, the driving start of the motor cylinder unit is executed by the angular change of the advance direction front side, but this may be executed by the angular change of the crawler traveling unit of the advance direction rear side.

Furthermore, the angular change of the crawler traveling unit on the rear side of the advance direction is used as a safety device, and preferably, the electric motor for traveling and the motor for the motor cylinder unit are stopped except that the angular change of the rear side is O within the predetermined integration rotational number of the electric motor for traveling after the angle of the front side with respect to the advance direction is changed (that is, S2, S9; S21, S26). For instance, traveling electric motor integration rotational number N is set in advance as the predetermined integration rotational number width set slightly bigger in the front and rear directions in comparison with the above-mentioned U1, U2, D1, D2. When the crawler traveling unit is moved, slipping, the angle detecting means of the rear side with respect to the advance direction subsequently detects the angular change even in the state that the movement of motor cylinder unit finishes. Then, when the angular change is still detected after its rotational number is over the predetermined integration rotational number width, error is judged so as to immediately stop the electric motor for traveling, to operate an electromagnetic brake and to stop the stairs moving unit.

Besides, for instance, the front crawler traveling unit is guided by the rail means in the going up state of the stairs. In case where the rear crawler traveling unit is out of the rail means, the motor cylinder unit is started to move by the angular change of the front crawler traveling unit, but the top end of the rear crawler traveling unit hits against the lowest step of the stairs so as to stop the self-propelled portion. In this state, the angular change quantity by the rear angle detecting means becomes to be 0 before not reaching the predetermined integration rotational number width. Then, the driving of the motor cylinder unit is immediately stopped and the electric motor for traveling is stopped.

Besides, when the front and rear angle detecting means 46, 47 detect the angular change over a predetermined boundary, that is, the angular change over the angle between the flat face and the inclined face of the rail means, the electric motor for traveling and the motor cylinder unit are immediately stopped, preferably. That is, when the front crawler traveling unit, for instance, is out of the rail means at the time of going the stairs down, the length of front and rear of the traveling unit is shorter than two steps of the stairs. So, when the connecting shaft 6 goes over the corner portion of the stairs, the front crawler traveling unit is widely rotated till its top end hits against the stairs one step lower. In a similar way, when the rear crawler traveling unit is out of the rail means, the traveling unit is rotated over the predetermined boundary. In this state, the motor cylinder unit (is not yet driven when the front crawler traveling unit is out of the rail means) is stopped, and the electric motor for traveling is stopped, and the electromagnetic brake is operated so as to immediately stop the stairs moving unit in this state.

As mentioned heretofore, by using the front and rear angle detecting means, the stairs moving unit is automatically stopped at unusual time. Then, safety can be also improved, and high incredibility and safety can be secured even if the guide rail is not used.

In the form of the above-mentioned embodiment, the case of the engaging the left side of the crawler traveling unit with the rail means was explained. But, the present self-propelled moving unit is comprised symmetrically in right and left. Then, even if the rail means and the guide rail are provided with left side or right side, it is applicable in a similar way. Besides, in the form of the above-mentioned embodiment, the case of putting a wheelchair on the pallet 7 was explained, but this is one of the best modes. Newspapers and magazines may be put on the pallet 7.

In the form of the above-mentioned embodiment, the front crawler traveling units and the rear crawler traveling units are provided with both right and left sides. But, one of the crawler traveling unit may be respectively provided with right and left as the self-propelled stairs moving unit.

Besides, in the form of the above-mentioned embodiment, the rail means is provided with one side of the stairs, and one of the front crawler traveling units of right and left and one of the rear crawler traveling units of right and left are guided by the rail means. But, the present invention is applicable in such a case where the front and rear crawler traveling units contact more than two steps of the stairs, and the inclined travel face of more than one step of the stairs is provided with the front hand, thereby the rail means is omitted.

The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A self-propelled stairs moving unit, capable of traveling on stairs in such a manner that the moving unit moves up and down the stairs by engaging a rail means provided on a side portion of the stairs and having the same inclination of the stairs, the self-propelled stairs moving unit comprising:

a self-propelled portion having a front crawler traveling unit and a rear crawler traveling unit respectively provided on right and left, and a driving source for driving said crawler traveling units, a right and a left support frame, each for rotatably connecting said front crawler unit and said rear crawler unit on right and left respectively;

a front rotatable connecting shaft connecting said right and left front crawler traveling units;

a pallet supported by said front rotatable connecting shaft and that is free to oscillate at its rear end with said front connecting shaft as its center of oscillation; and a horizontal holding means for holding said pallet to be level in spite of inclination of said self-propelled portion.

2. The self-propelled stairs moving unit as set forth in claim 1 further comprising rail means provided on a side portion of the stairs and having the inclination of the stairs, with one side of said crawler traveling units guided so as to be prevented from slipping by said rail means and the other side of said crawler traveling units traveling on the stairs.

3. The self-propelled stairs moving unit as set forth in claim 1 wherein said self-propelled portion has a front self-propelled portion and a rear self-propelled portion, the front self-propelled portion is comprised in such a manner that the front crawler traveling units of right and left are unitedly connected with each other with a front driving shaft connecting right and left front driving wheels and a front rotatable connecting shaft connecting the center portions of right and left front truck frames, and a front electric motor is provided bridging between the front driving shaft and the front connecting shaft, and an output shaft of the front electric motor is interlocked with the front driving shaft, the rear self-propelled portion is comprised in such a manner that the rear crawler traveling units of right and left are unitedly connected with each other with a rear driving shaft connecting right and left rear driving wheels and a rear connecting shaft connecting the center portions of right and left rear truck frames, and a rear electric motor is provided bridging between the rear driving shaft and the rear connecting shaft, and an output shaft of the rear electric motor is interlocked with the rear driving shaft, and the support frames of right and left are rotatably supported by the front connecting shaft of the front self-propelled portion and the rear connecting shaft of said rear self-propelled portion.

4. The self-propelled stairs moving unit as set forth in claim 1 wherein said horizontal holding means has a guide rail provided on a side portion of the stairs, rotating rollers provided projecting for a side of said pallet, and springs provided between said pallet and said support frames, whereby said pallet is held to be almost level in such a manner that said spring receives a moment load acting on said pallet and said rotating roller is contacted with said guide rail so as to rotate and is guided by said guide rail.

5. The self-propelled stairs moving unit as set forth in claim 1 wherein said horizontal holding means has a level detecting means for detecting an angle of said pallet with respect to a level face, and a cylinder unit provided between said pallet and said support frame, whereby said cylinder unit is controlled to be shrunk and extended on the basis of a signal from said level detecting means so as to hold said pallet to be almost level.

6. The self-propelled stairs moving unit as set forth in claim 1 wherein said horizontal holding means has a detecting means for detecting a relation of said self-propelled portion with respect to the stairs when said self-propelled portion travels on the stairs, and a cylinder unit provided between said pallet and said support frame, whereby said cylinder unit is controlled to be shrunk and extended by a signal from said detecting means on the basis of a program set in advance with an inclination of the stairs so as to hold said pallet to be almost level.

7. The self-propelled stairs moving unit as set forth in claim 1 wherein said pallet comprises a right side, a left side, a front face, a rear face and a bottom face, and a protection frame is provided on said right and left sides and on said rear face of said pallet and an extension plate is rotatably supported by said bottom face of said pallet and is disposed on said front face of said pallet, said extension plate being comprised of a folded structure.

8. The self-propelled stairs moving unit as set forth in claim 2 wherein said crawler traveling unit has a rubber crawler having teeth formed at a predetermined pitch over a whole outer peripheral face, and said rail means has a longer member having teeth formed at the same pitch as one of said rubber crawler and a snaking prevention guide for guiding the sides of said rubber crawler, located along right and left of said longer member.

9. The self-propelled stairs moving unit as set forth in claim 8 wherein said longer member is comprised of a rubber toothed open belt.

10. The self-propelled stairs moving unit as set forth in claim 2 wherein an idler roller is provided coaxially with a connecting portion of said crawler traveling unit for the left or right support frame, and a coming up prevention guide rail for preventing one side of said crawler traveling units from coming up from the rail means by contacting said idler roller so as to rotate and is provided with an upper hand of said rail means.

11. The self-propelled stairs moving unit as set forth in claim 2 wherein said self-propelled portion has a front self-propelled portion and a rear self-propelled portion, the front self-propelled portion is comprised in such a manner that the front crawler traveling units of right and left are unitedly connected with each other with a front driving shaft connecting right and left front driving wheels and a front connecting shaft connecting the center portions of right and left front truck frames, and a front electric motor is provided bridging between the front driving shaft and the front connecting shaft, and an output shaft of the front electric motor is interlocked with the front driving shaft, the rear self-propelled portion is comprised in such a manner that the rear crawler traveling units of right and left are unitedly connected with each other with a rear driving shaft connecting right and left rear driving wheels and a rear connecting shaft connecting the center portions of right and left rear truck frames, and a rear electric motor is provided bridging between the rear driving shaft and the rear connecting shaft, and an output shaft of the rear electric motor is interlocked with the rear driving shaft, and the support frames of right and left are rotatably supported by the front connecting shaft of the front self-propelled portion and the rear connecting shaft of said rear self-propelled portion.

12. The self-propelled stairs moving unit as set forth in claim 2 wherein the length of a crawler contacting ground face per one crawler traveling unit is less than the length of two steps of the stairs.

13. The self-propelled stairs moving unit as set forth in claim 1 wherein a plurality of supporting wheels including casters is provided on a lower hand of said pallet, and further wherein an operation means is provided for switching into a position projecting said crawler traveling unit to a lower hand and a position retreating to the upper portion with respect to said supporting wheels.

14. The self-propelled stairs moving unit as set forth in claim 1 wherein a plurality of supporting wheels including casters is provided on a lower hand of said pallet, and further wherein an operation means is provided for switching said self-propelled stairs moving unit into a position projecting said front crawler traveling unit and said rear crawler traveling unit to a lower hand and a position retreating to an upper portion with respect to said supporting wheels, and a position retreating one of said front and rear crawler traveling units to an upper portion with respect to said casters and projecting the other crawler traveling unit to a lower hand with respect to said other supporting wheels.

* * * * *